(12) United States Patent
Bye

(10) Patent No.: US 10,712,885 B2
(45) Date of Patent: Jul. 14, 2020

(54) TOUCH SCREEN DEVICE INCORPORATING A DISPLAY AND A CAPACITIVE TOUCH SENSOR UTILIZING PLURAL CHARGE ACCUMULATIONS WITH VARIABLE TIME DELAYS

(71) Applicant: Solomon Systech (Shenzhen) Limited, Shenzhen (CN)

(72) Inventor: David Keith Bye, Whiteley (GB)

(73) Assignee: Solomon Systech (Shenzhen) Limited, Shenzhen (CN)

(*) Notice: Subject to any disclaimer, the term of this patent is extended or adjusted under 35 U.S.C. 154(b) by 0 days.

(21) Appl. No.: 16/106,034

(22) Filed: Aug. 21, 2018

(65) Prior Publication Data
US 2019/0064962 A1 Feb. 28, 2019

(30) Foreign Application Priority Data
Aug. 25, 2017 (GB) .................................. 1713686.2

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01); *G06F 3/04184* (2019.05)

(58) Field of Classification Search
CPC ...... G06F 3/041; G06F 3/0412; G06F 3/0416; G06F 3/04166; G06F 3/041661; G06F 3/041662; G06F 3/0418; G06F 3/04184; G06F 3/044; G06F 3/0446
See application file for complete search history.

(56) References Cited

U.S. PATENT DOCUMENTS

| | | | | |
|---|---|---|---|---|
| 2014/0232691 | A1* | 8/2014 | Lee ........................ | G06F 3/044 345/174 |
| 2015/0212644 | A1* | 7/2015 | Noto ...................... | G06F 3/0416 345/174 |
| 2015/0277660 | A1* | 10/2015 | Yang ...................... | G06F 3/0418 345/173 |
| 2018/0143726 | A1* | 5/2018 | Reynolds ............ | G02F 1/13338 |

* cited by examiner

*Primary Examiner* — Keith L Crawley
(74) *Attorney, Agent, or Firm* — Idea Intellectual Limited; Margaret A. Burke; Sam T. Yip

(57) ABSTRACT

A touch screen device incorporating a display and a capacitive touch sensor. The device has a mode of operation in which a single touch sensor measurement is made up of multiple charge accumulations, which take place in different display cycles, 'H-sync', and whose time windows, defined by switch 'S1', commence with different time delays, 0, Δt1 and (Δt1+Δt2) from the drive pulse edge, 'drive', whose induced charge transfer they are accumulating. By subdividing the measurement into multiple charge accumulations, the amount of time needed in each display cycle for performing the touch sensor measurement can be reduced to avoid coinciding with periods of high display-induced noise.

14 Claims, 15 Drawing Sheets

ON-STACK LCD

| | | |
|---|---|---|
| TOUCH SENSOR STACK | TOUCH PANEL | S1 |
| | DECORATION | S2 |
| | Y ELECTRODES | S3 |
| | DIELECTRIC | S4 |
| | X ELECTRODES | S5 |
| | SUBSTRATE | S6 |
| LCD DISPLAY STACK | TOP POLARISER | D1 |
| | COLOUR FILTER GLASS | D2 |
| | BLACK MATRIX | D3 |
| | COLOUR FILTER | D4 |
| | LIQUID CRYSTAL | D5 |
| | METAL & TFTs | D6 |
| | TFT GLASS | D7 |
| | BOTTOM POLARISER | D8 |
| | BACKLIGHT | D9 |

FIG. 12

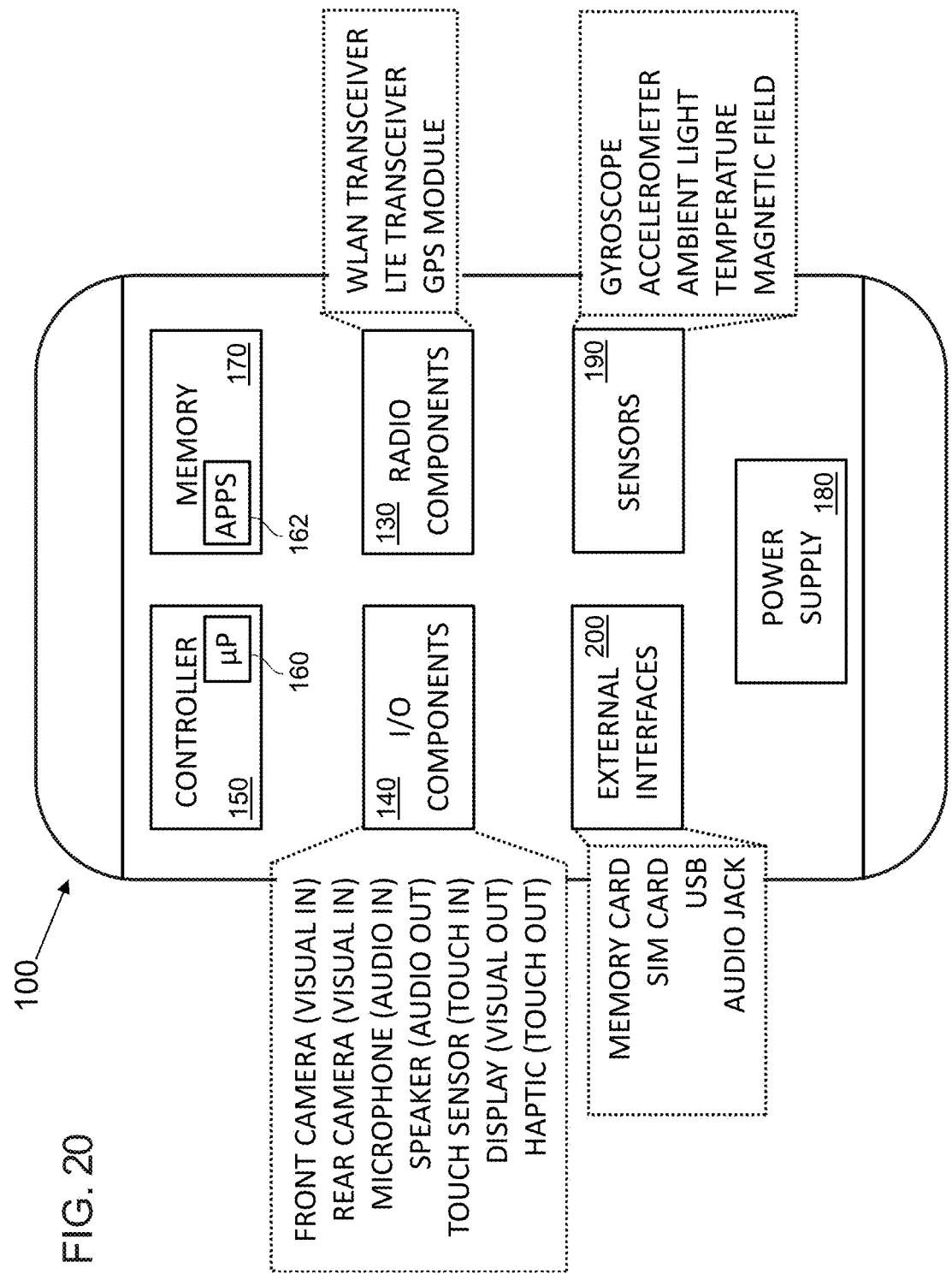

TOUCH SCREEN DEVICE INCORPORATING A DISPLAY AND A CAPACITIVE TOUCH SENSOR UTILIZING PLURAL CHARGE ACCUMULATIONS WITH VARIABLE TIME DELAYS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATION

The present invention claims priority to United Kingdom Patent Application No. GB1713686.2 filed Aug. 25, 2017, the disclosure of which is incorporated by reference herein.

FIELD OF THE INVENTION

The present disclosure relates to capacitive touch sensors integrated with displays to form touch screens.

BACKGROUND

A capacitive touch sensor, referred to simply as a touch sensor in the following, may detect the presence and location of a touch or the proximity of an object (such as a user's finger or a stylus) on a surface. Touch sensors are often combined with a display to produce a touch screen. A touch screen enables a user to interact directly with what is displayed on the screen through a graphical user interface (GUI), rather than indirectly with a mouse or touch pad. A touch sensor may be attached to or provided as part of a mobile phone, tablet or laptop computer, for example.

Touch sensors may be classified into grid and matrix types. In a matrix type, an array of electrodes is arranged on the surface which are electrically isolated from each other, so that each electrode in the array provides its own touch signal. A matrix type touch sensor is therefore naturally suited to situations in which an array of touch-sensitive buttons are needed, such as in a control interface, data entry interface or calculator. In a grid type, there are two groups of parallel electrodes, usually referred to as X and Y electrodes, since they are typically arranged orthogonal to each other. A number of nodes are defined by the crossing points of pairs of X and Y electrodes (as viewed in plan view), where the number of nodes is the product of the number of X electrodes and Y electrodes. A grid type touch sensor is the type typically used for touch screens on mobile phones, drawing tablets and so forth. In earlier designs, the X and Y electrodes are arranged either side of a dielectric layer, so they are vertically offset from each other by the thickness of the dielectric layer, vertical meaning orthogonal to the plane of the stack layers. In more recent designs, to reduce stack thickness, the X and Y electrodes are deposited on the same side of a dielectric layer, i.e. in a single layer, with thin films of dielectric material being locally deposited at the cross-overs to avoid shorting between the X and Y electrodes. A single electrode layer design of this kind is disclosed in US 2010/156810 A1, the entire contents of which are incorporated herein by reference.

Touch sensors may also be classified into self capacitance and mutual capacitance types.

In a self capacitance measurement, the capacitance being measured is between an electrode under a dielectric touch panel and the touching finger, stylus etc., or more precisely the effect that the touch's increase in capacitance with the electrode has on charging a measurement capacitor that forms part of the touch IC's measurement circuit. The finger and the electrode can thus be thought of as acting as the plates of a capacitor with the touch panel being the dielectric.

In a mutual capacitance measurement, adjacent pairs of electrodes are arranged under the touch panel, and form the nominal plates of the capacitor. A touching body acts to modify the capacitance associated with the electrode pair by replacing what was the ambient environment, i.e. in most cases air, but possibly water or some other gas or liquid, with the touching object, which may be effectively a dielectric material (e.g. a dry finger, or a plastics stylus) or in some cases could be conductive (e.g. a wet finger, or a metal stylus). One of the pair of electrodes is driven with a drive signal, e.g. with a burst of pulses, and the other electrode of the pair senses the drive signal. The effect of the touch is to attenuate or amplify the drive signal received at the sense electrode, i.e. affects the amount of charge collected at the sense electrode. Changes in the mutual capacitance between a drive electrode and a sense electrode provide the measurement signal. It is noted that in a mutual capacitance grid sensor, there is a convention to label drive electrodes as the X electrodes and sense electrodes as the Y electrodes, although this choice is arbitrary. A perhaps clearer labelling that is often used is to label the drive electrodes as "Tx" for transmission and the sense electrodes as "Rx" for receiver in analogy to telecoms notation, although this labelling is of course specific to mutual capacitance measurements.

Current industry standard touch screens for mobile phones rely on operating the same touch sensor to make both self capacitance and mutual capacitance measurements, since acquiring both is beneficial to gaining additional information about the touch which can be used in post-processing to increase the reliability of interpretation. For example, the presence of moisture can be inferred by comparing mutual capacitance and self capacitance measurements.

Currently, the most common display technologies that are integrated with touch sensors to form a touch screen are thin film transistor (TFT) liquid crystal displays (LCDs) and organic light emitting diode (OLED) displays, and the touch sensor design is a grid design operated to make both self capacitance and mutual capacitance measurements.

The general issue that the present invention addresses is the problems associated with the desire for ever-thinner stacks with ever-higher display resolution for touch screens. Both factors make it increasingly difficult to collect the touch sensor signal, the touch sensing being timed relative to the display cycles to take place during portions of the display cycle where there is the least display noise. In concrete terms, the touch sensing measurement in each display cycle is carried out in a time slot as far away as possible from the horizontal-synchronisation (H-sync) pulse which drives the display pixel rows, when there is the least display noise.

A thinner stack means that electrode layers for the display are closer to the touch sensor electrode layers, so they couple more strongly, which means that display noise becomes bigger for the touch sensor. A thinner stack also means less vertical separation between the two touch sensor electrode layers, so that they have a larger mutual capacitance and so it takes longer to charge and discharge the touch sensor, i.e. the measurements become slower. A charge time on a thicker stack might be 500 ns, whereas the charge time might increase to 1 or 2 μs, or more, for thinner stacks. Higher display resolution means that there are more display rows and columns to address per frame, so that the number of drive pulses which have to be fitted into a 60 Hz refresh rate (i.e. 16.67 ms per refresh) increases. As more time in each refresh is taken up with display drive signals, there is less time available with relatively low display noise that is suitable for collecting the touch sensing signal.

In an OLED (organic light emitting diode) touchscreen, the major coupling between the display electrodes and the overlaid touch sensing electrodes is between the display source (i.e. cathode) layer and the touch sense (Y) layer, since these have conductive features that run parallel to each other with a small vertical separation in the display stack.

It is therefore desirable to provide touch screen designs which allow the touch sensor to operate in combination with the display, as the displays evolve to higher resolution and the touch sensor layers are arranged ever-closer to the display layers.

BRIEF SUMMARY OF THE INVENTION

According to one aspect of the disclosure, there is provided a touch screen device incorporating a display and a capacitive touch sensor, the device comprising:

a display drive signal generator operable to output display drive signals at a certain frequency to the display, so that the display is driven in cycles to form image frames on a display area of the display, each image frame being created by a plurality of display drive cycles;

a set of sensor electrodes which define a touch sensitive area which is at least partly co-extensive with the display area;

a drive pulse generator operable to supply drive pulses to at least some of the sensor electrodes;

at least one sampling capacitor for accumulating charge from at least some of the sensor electrodes resulting from capacitive coupling between (in the case of mutual capacitance) or to (in the case of self capacitance) the sensor electrodes induced by edges of the drive pulses;

a sampling switch whose switch state enables a charge accumulation to take place on the at least one sampling capacitor;

a voltage reader for measuring a voltage associated with a charge accumulation on the at least one sampling capacitor; and a controller operable to perform capacitive touch sensor measurements according to a mode of operation in which a single touch sensor measurement is made up of a plurality of at least first and second charge accumulations, which take place in different display cycles and which have different first and second time delays from the drive pulse edge whose induced charge transfer they are accumulating.

In embodiments that relate to a matrix-type touch sensor, the sensor electrodes will include a set of X sensor electrodes and a set of Y sensor electrodes arranged to cross each other to form a two-dimensional array of sensing nodes for performing mutual capacitance measurements. The device can then be operable in a mutual capacitance measurement mode in which: the drive pulse generator is operable to supply drive pulses to the X sensor electrodes; and the sampling capacitor(s) are operable to accumulate charge from the Y electrodes resulting from capacitive coupling at the sensing nodes between crossing X and Y sensor electrodes initiated by edges of the X-drive pulses. The same device can also be operated in a self capacitance measurement mode in which: the drive pulse generator is operable to supply drive pulses to the X sensor electrodes and the Y sensor electrodes; and the sampling capacitor(s) are operable to accumulate charge from the X sensor electrodes and the Y sensor electrodes resulting from drive-pulse induced capacitive coupling between the sensor electrodes and touches.

In embodiments that relate to a grid-type touch sensor, the device can be operable in a self capacitance measurement mode in which: the drive pulse generator is operable to supply drive pulses to the sensor electrodes; and the sampling capacitor(s) are operable to accumulate charge from the sensor electrodes resulting from drive-pulse induced capacitive coupling between the sensor electrodes and touches.

In said mode of operation, the plurality of charge accumulations that are accumulated with a number of time delays can, for example, be selected from the group: 2, 3, 4, 5, 6, 7, 8, 9, 10 or a higher number.

In said mode of operation, for each touch sensor measurement, the plurality of charge accumulations are induced by one of: positive-going drive pulse edges; negative-going drive pulse edges; and pairs of positive- and negative-going drive pulse edges.

In some embodiments, in said mode of operation, the time delays are chosen so as to be equal or approximately equal. In other embodiments, in said mode of operation, the time delays are unequal. In particular, they can be selected with the aim of providing charge accumulations and thus voltage values of approximately equal magnitude to each other. So for a typical exponential charge accumulation, the time span of an accumulation nearer the beginning of the exponential rise will be shorter than those later when the rate of charge accumulation is reduced.

In some embodiments, for executing said mode of operation, the controller is configured to vary the time delays between different ones of the charge accumulations by advancing the timing of the drive pulse edges within the display cycles.

In some embodiments, the controller is operable to control the switch state of the sampling switch so that each charge accumulation finishes before, preferably just before, the end of one display cycle and the start of another, so as to avoid picking up noise associated with the start of the next display cycle, while taking advantage of the lower noise environment that occurs near the end of each display cycle. Here, 'just before' means that the sampling switch changes state before the onset of any noise triggered by the start of the next display cycle, so that this noise is not picked up in the charge accumulation.

The device may be further provided with a reset switch whose switch state diverts charge transfer initiated by drive pulses away from the sampling capacitor. The controller is then operable in said mode of operation to control the switch state of the reset switch so as to divert charge transfer initiated by drive pulses away from the sampling capacitor when the sampling switch is in a switch state that does not enable a charge accumulation.

The device may be further provided with display electrodes configured to receive the display drive signals and to distribute them over the display area to form image frames. The display electrodes have a significant, undesired capacitive coupling to the sensor electrodes which is a source of noise to the capacitive touch sensor. The controller is configured to separate temporally in each display cycle the display drive signals from the charge accumulation.

According to another aspect of the disclosure, there is provided a method of operating a touch screen device incorporating a display having a display area, and a capacitive touch sensor comprising a set of sensor electrodes which define a touch sensitive area which at least partly co-extensive with the display area, the method comprising:

outputting display drive signals at a certain frequency to the display, so that the display is driven in cycles to form image frames on the display area, each image frame being created by a plurality of display drive cycles;

supplying drive pulses to at least some of the sensor electrodes;

accumulating charge from at least some of the sensor electrodes resulting from capacitive coupling between or to the sensor electrodes induced by edges of the drive pulses on a sampling capacitor;

switching a sampling switch to define a time window for accumulating charge on the sampling capacitor;

measuring a voltage associated with a charge accumulation on the sampling capacitor; and performing capacitive touch sensor measurements according to a mode of operation in which a single touch sensor measurement is made up of a plurality of at least first and second charge accumulations, which take place in different display cycles and whose time windows commence with different first and second time delays from the drive pulse edge whose induced charge transfer they are accumulating.

BRIEF DESCRIPTION OF THE DRAWINGS

In the following, the present invention will further be described by way of example only with reference to exemplary embodiments illustrated in the figures.

FIG. 12 shows a sensor and display stack of an on-stack LCD embodiment of the disclosure.

FIG. 20 is a block diagram of the functional components of the computing device of FIG. 19A and FIG. 19B.

DETAILED DESCRIPTION OF THE PREFERRED EMBODIMENTS

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

Figure 1:
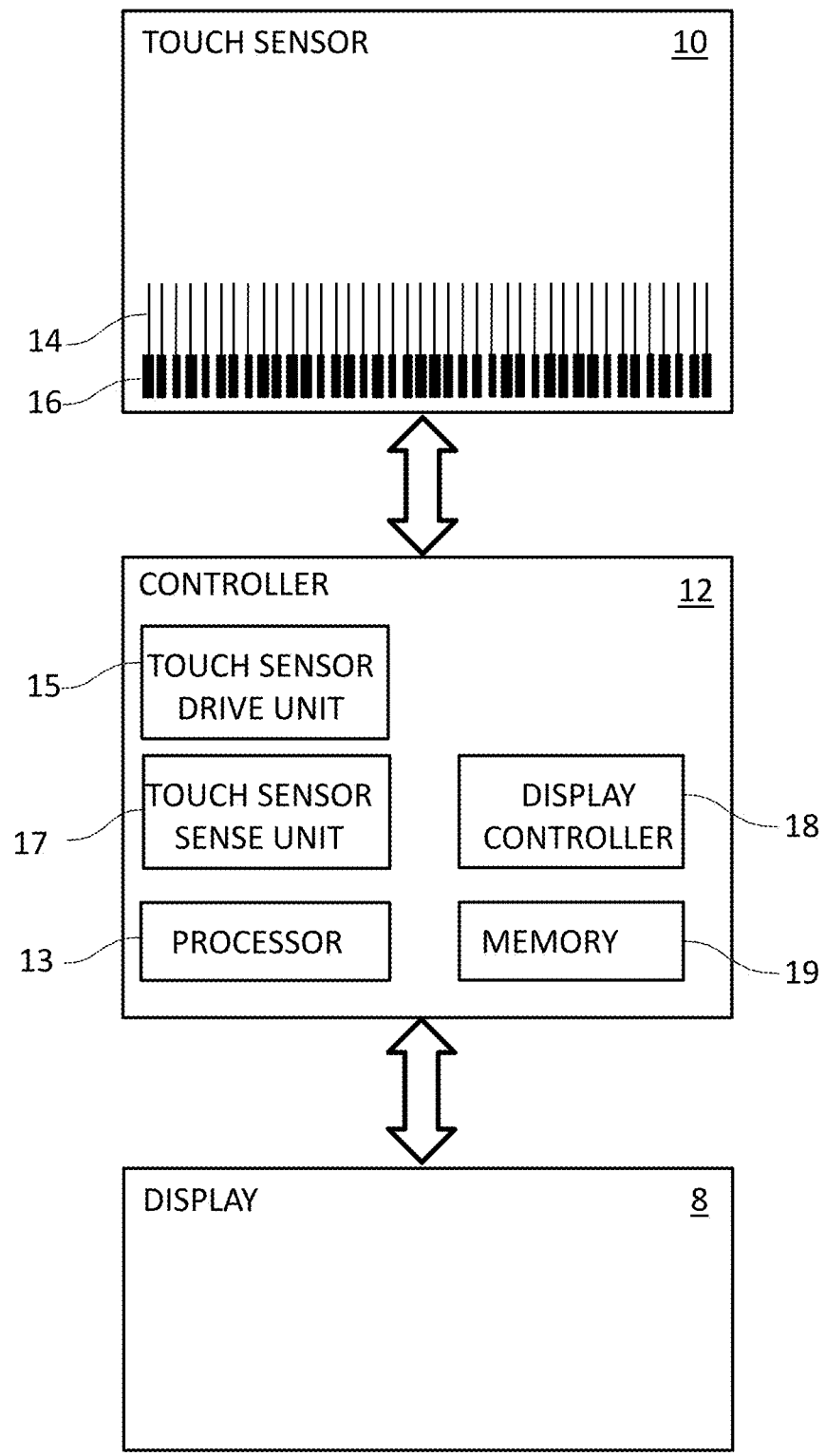
FIG. 1 illustrates an example touch sensor with an example controller.

FIG. 1 illustrates an example display 8 and touch sensor 10 with a controller 12 which is a combined touch-sensor controller and display controller. A touch-sensor controller is often referred to in the art as a touch integrated circuit (touch IC) or touch sensor/screen controller/chip (TSC). The touch sensor 10 in combination with its controller 12 may detect the presence and location of a touch or the proximity of an object within a touch-sensitive area of the touch sensor 10. The touch sensor 10 may include one or more touch-sensitive areas. The touch sensor 10 may include an array of electrodes which may be arranged in a single layer or multiple layers. The electrode array will usually be of a conductive material, each layer of which is deposited on a dielectric material that forms a substrate, e.g. for support and/or to provide a suitable deposition surface. In the following, the controller is sometimes referred to as the touch-sensor controller or the touch-sensor and display controller when describing touch-sensing functions.

Each electrode may be an area of conductive material of a desired topographic form. As an example and not by way of limitation, an electrode may be made of indium tin oxide (ITO), which is chosen for display applications, since it is transparent in the visible region. The proportion of the electrode area covered by conductive material may vary depending on the design, this percentage being sometimes referred to in the art as the fill percentage. As an example and not by way of limitation, an electrode may be made of metal or metallic material or other conductive material such as for example copper, silver, or a copper- or silver-based material or silicide. The necessary fine structure to produce a desired topography in metal is sometimes referred to as fine line metal (FLM). The conductive material may be fine-meshed in addition to its topographic form where the holes in the mesh are sized and arranged to coincide in a direction perpendicular to the plane of the touch sensor with underlying light emitters of a display, such as an OLED display. This disclosure contemplates any suitable electrodes made of any suitable conductive material forming any suitable shapes with any suitable fill percentages having any suitable patterns which fulfil a specification.

In embodiments of the disclosure, the display and the touch sensor are fabricated as a laminar structure comprising a number of layers which are deposited or otherwise fabricated in a particular sequence. The layered structure is referred to in the art as a stack. In some embodiments, the touch screen and display layers are formed as a single stack, sometimes referred to as an integrated touch screen. Alternatively, a touch screen may be fabricated from a distinct sensor stack and a distinct display stack, wherein the two stacks are unified in some suitable way as independent sub-assemblies, e.g. by a suitable bonding. The stack may comprise a substrate (or multiple substrates) and the conductive material forming the electrodes of the touch sensor 10.

The layers of a display stack enable a display screen to produce a colour or monochromatic image. The number, type and juxtaposition of layers depends on the type of display screen. For example, an LCD will have different layers and layer sequences than an OLED display. To form a touch screen, a touch sensor is typically placed over the display stack, either integrated as one stack or as two separate stacks which are arranged together after their respective manufacture.

As an example and not by way of limitation, the stack may include a first layer of optically clear adhesive (OCA) beneath a touch panel of a display stack. The touch panel may be clear and made of a resilient material suitable for repeated touching, such as for example a glass material, or a plastics material. Suitable glasses are from the alkali aluminosilicate family. Suitable plastics materials include polycarbonate (PC) and polymethyl methacrylate (PMMA). This disclosure contemplates any suitable touch panel made of any suitable material. The first layer of OCA may be disposed between a layer or substrate of the display stack and the substrate with the conductive material forming the electrodes. The substrate with the conductive material may provide a benefit or feature in producing an image (e.g., it may be a layer or substrate found in a typical, non-touch, display stack) or it may be a layer added specifically to provide a substrate on which the electrodes are formed. In some embodiments, the stack may also include a second layer of OCA. In some embodiments, the stack may also include a dielectric layer (which may be made of polyethylene terephthalate (PET) or another suitable material, similar to the substrate with the conductive material forming the electrodes). As an alternative, where appropriate, a thin coating of a dielectric material may be applied instead of the second layer of OCA and/or the dielectric layer. The second layer of OCA may be disposed between the substrate with the conductive material making up the electrodes and the dielectric layer, and the dielectric layer may be disposed between the second layer of OCA and another layer of the display stack. As an example only and not by way of limitation, the touch panel may have a thickness of approximately 0.15 to 1 mm; the first layer of OCA may have a thickness of approximately 0.05 mm; the substrate with the conductive material forming the electrodes may have a thickness of approximately 0.05 mm; the second layer of OCA may have a thickness of approximately 0.05 mm; and the dielectric layer may have a thickness of approximately 0.05 mm. Although this disclosure describes particular example stacks with particular layers and orders of layers made of particular materials and having particular thicknesses, this disclosure contemplates any suitable stack with any suitable number of any suitable layers made of any suitable materials and having any suitable thicknesses.

In particular embodiments, the electrodes of the touch sensor 10 may be made of ITO in whole or in part. In particular embodiments, the electrodes of the touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

In a self capacitance implementation or mode of use, the touch sensor 10 has an array of electrodes of a single type that each singly forms a capacitive node. When an object touches or comes within proximity of the capacitive node, a change in self capacitance may occur at the capacitive node and the touch-sensor controller 12 may measure the change in capacitance, for example, as a change in the amount of charge needed to raise the voltage at the capacitive node by a pre-determined amount. As with a mutual capacitance implementation, by measuring changes in capacitance throughout the array, the touch-sensor controller 12 may determine the position of the touch or proximity within the touch-sensitive area(s) of the touch sensor 10.

In a mutual capacitance implementation or mode of use, the touch sensor 10 has an array of electrodes of at least two different types for drive and sense respectively, which cross each other (in plan view) to form an array of capacitive nodes. A given pair of drive and sense electrodes forming a capacitive node cross each other without making electrical contact, but with capacitive coupling across a solid dielectric situated between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of the touch sensor 10. In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines, although other angles of crossing are possible. Herein, reference to a drive line may encompass one or more drive electrodes making up the drive line. Similarly, reference to a sense line may encompass one or more sense electrodes making up the sense line.

It will be further understood that a particular touch sensor 10 may be operable in both self capacitance and mutual capacitance modes using the same electrodes, wherein the controller 12 is configured to switch between these modes as desired.

To enable mutual capacitance measurements to be made, the touch sensor 10 has two types of electrodes (e.g. X and Y) formed in a grid pattern on either side of a dielectric or on one side of a dielectric. A pair of electrodes, one from each type, capacitively coupled to each other across a space between them may form a capacitive node. For a self capacitance implementation, both types of electrode are generally used (although in principle a self capacitance measurement could be made with only a single type). For example, to carry out a self capacitance measurement, all the X and Y electrodes can be driven to a certain potential and then discharged through an analogue integrator. Each pin has a tristate output architecture and an analogue integrator (or a connection to allow each pin to be multiplexed to an analogue integrator), with the states being: drive, float, switch to integrator, measure and discharge. The same touch sensor is therefore able to operate in both mutual capacitance and self capacitance modes.

Where the electrodes of the two different types cross (as viewed in plan view) and hence come nearest to each other a capacitive node is formed. Where they cross, the electrodes do not make electrical contact with each other, but are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of the touch sensor 10 may indicate a touch or proximity input at the position of the capacitive node. The touch-sensor controller 12 may detect and process the change in capacitance to determine the presence and location of the touch or proximity input. The touch-sensor controller 12 may then communicate information about the touch or proximity input to one or more other components (such one or more central processing units (CPUs)) of a device that includes the touch sensor 10 and the touch-sensor controller 12, which may respond to the touch or proximity input by initiating a function of the device (or an application running on the device) associated with it. Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

In particular embodiments, the controller 12 comprises analogue circuitry, digital logic, and digital volatile or non-volatile memory. The controller 12 may include one or more integrated circuits (ICs), such as for example general-purpose microprocessors, microcontrollers, programmable logic devices or programmable logic arrays (PLAs), or application-specific ICs (ASICs). The memory of the controller 12 may be a random access memory (RAM), a read-only memory (ROM), an erasable programmable read-only memory (EPROM or Flash memory), a static random access memory (SRAM), and any suitable combination of the foregoing. The controller 12 may be programmed with computer readable program instructions which can be downloaded from a computer readable storage medium or an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The controller 12 comprises electronic circuitry and may be programmed, for example, with programmable logic circuitry, field-programmable gate arrays (FPGA), or programmable logic arrays (PLA) which may execute the computer readable program instructions by utilizing state information of the computer readable program instructions to personalize the electronic circuitry, in order to perform aspects of the present disclosure.

In particular embodiments, the touch-sensor and display controller 12 is disposed on a flexible printed circuit (FPC) bonded to the substrate of the touch sensor 10. The FPC may be active or passive, where appropriate. In particular embodiments, multiple controller chips are disposed on the FPC. The touch-sensor and display controller 12 may include a processor 13, a touch sensor drive unit 15, a touch sensor sense unit 17, a display controller 18 and a memory 19. The display controller 18 has a generator part operable to generate display drive signals which are output with a certain frequency, e.g. 60 Hz, to the display, so that the display is driven in cycles to form image frames on a display area of the display, each image frame being created by a plurality of display drive cycles. The drive unit 15 may supply drive signals to the drive electrodes of the touch sensor 10 for making mutual capacitance measurements. In particular, the drive unit 15 includes an X-drive pulse generator operable to supply X-drive pulses to X sensor electrodes which are described further below. The sense unit 17 may sense charge at the capacitive nodes of the touch sensor 10, in both mutual and self capacitance measurements, and provide measurement signals to the processor 13 representing capacitances at the capacitive nodes. In particular, the sense unit 17 includes at least one sampling capacitor Cs for accumulating charge from Y sensor electrodes resulting from capacitive coupling at the sensing nodes between crossing X and Y sensor electrodes initiated by edges of the X-drive pulses, as described further below. The sense unit 17 also includes various switches for controlling charge accumulation on the sampling capacitor, principally a sampling switch whose switch state enables a charge accumulation to take place on the sampling capacitor(s) as initiated by an X-drive pulse edge, as described further below. The sense unit 17 also includes a voltage reader, such as an analogue-to-digital converter (ADC) for holding a voltage value associated with a charge accumulation on the sampling capacitor(s). The processor 13 is operable to read out voltage values from the voltage reader. The processor 13 may control the supply of drive signals to the drive electrodes by the drive unit 15 and process measurement signals from the sense unit 17 to detect and process the presence and location of a touch or proximity input within the touch-sensitive area(s) of the touch sensor 10. The processor 13 may also follow changes in the position of a touch or proximity input within the touch-sensitive area(s) of the touch sensor 10. The memory 19 may store programming for execution by the processor 13, including programming for controlling the drive unit 15 to supply drive signals to the drive electrodes, programming for processing measurement signals from the sense unit 17, and other suitable programming, where appropriate. Although this disclosure describes a particular touch-sensor and display controller having a particular implementation with particular components, this disclosure contemplates any suitable touch-sensor and display controller having any suitable implementation with any suitable components.

On a substrate of the touch sensor 10, a plurality of tracks 14 of conductive material are disposed to couple each of the X and Y electrodes of the touch sensor 10 to connection pads 16, which are disposed on a substrate of the touch sensor 10. The connection pads 16 facilitate coupling of the tracks 14 (and hence X and Y electrode lines) to the controller 12. The tracks 14 may extend into or around (e.g. at the edges of) the touch-sensitive area(s) of the touch sensor 10. A particular subset of the tracks 14 may provide drive connections for coupling controller 12 to drive electrodes of the touch sensor 10, through which the drive unit 15 of controller 12 may supply drive signals to the drive electrodes. Other tracks 14 may provide sense connections for coupling controller 12 to sense electrodes of the touch sensor 10, through which the sense unit 17 of controller 12 may sense charge at the capacitive nodes of the touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of the touch sensor 10 (similar to tracks 14).

The connection pads 16 may be located along one or more edges of the touch sensor 10, outside the touch-sensitive area(s). As described above, the controller 12 may be on an FPC. The connection pads 16 may be made of the same material as the tracks 14 and may be bonded to the FPC using an anisotropic conductive film (ACF). The connection may include conductive lines on the FPC coupling the controller 12 to the connection pads 16, in turn coupling the controller 12 to the tracks 14 and to the electrodes of the touch sensor 10. This disclosure contemplates any suitable form or type of connection between the controller 12 and the touch sensor 10.

Figure 2A:
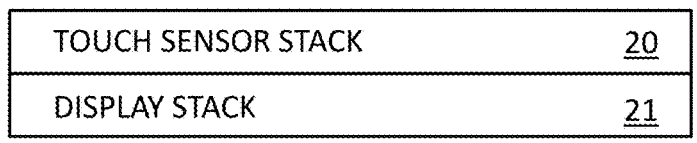
FIG. 2A illustrates a block diagram of an on-stack touch screen where the layers associated with the sensor function are physically separate from and functionally independent of the layers associated with the display function.

FIG. 2A illustrates a block diagram of an on-stack touch screen in accordance with particular embodiments comprising a touch sensor stack 20 arranged on a display stack 21. In an on-stack design, the layers associated with the sensor function are physically separate from and largely electrically functionally independent of the layers associated with the display function (although there will inevitably be some capacitive coupling of the touch sensor to conductive parts of the display stack, principally the TFT drive electrodes).

Figure 2B:
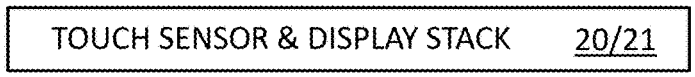
FIG. 2B illustrates a block diagram of an in-cell touch screen where the layers associated with the sensor function and display function are interleaved and/or shared.

FIG. 2B illustrates a block diagram of an in-cell touch screen in accordance with particular embodiments comprising a combined touch sensor and display stack 20, 21. In an in-cell design, the layers associated with the sensor function and display function are interleaved and/or shared.

The display stack 21 may comprise a plurality of layers configured to generate a colour image. The type and number of layers within the display stack 21 may vary depending on the type of display stack and/or the intended application of the display stack. For example, an LCD display stack 21 will typically require at least two polarisers above and below the liquid crystal layer, whereas an OLED display stack 21 does not require polarisers, but may include one or two. Each layer may comprise a particular feature or characteristic used in a display stack 21 for generating an image. These layers may in some embodiments, be configured to provide a colour image. Particular embodiments contemplate the display stack 21 comprising any number and/or type of layers for any type of display. In some embodiments, the display stack 21 may be a flexible display stack. In some embodiments, the display stack 21 may be curved over one or more parts of its surface (e.g. Samsung Galaxy Edge (trade mark) mobile telephone) or over its whole surface (e.g. large screen television). In still further embodiments, the display stack 21 may be flexible so that it can be flat or adopt a variety of complex curves depending on its environment. It is noted that for non-flat stacks, references to x and y or X and Y should be interpreted to lie in the plane of the stack layers, even if the plane is curved or otherwise non-planar in real space.

One or more components of the touch sensor 10 may be integrated into the display stack 21 in any of a variety of different ways, depending on operational needs or the particular embodiment. The touch sensor 10 may be located in any of a variety of different locations within the display stack 21. The location of the touch sensor 10 may vary depending on the type of the display stack 21 (e.g., an LCD display, OLED display, e-ink display etc.). For example, in an LCD display in which display stack 21 includes at least two polarisers, the touch sensor 10 may be positioned within the display stack 21 so as to not alter the polarisation of the light. For example, in an LCD display stack 21, if the touch sensor 10 includes a substrate made of a birefringent material, then the touch sensor 10 is not arranged between the LCD's two polarisers, but rather above them. If the touch sensor 10 includes a substrate made of a non-birefringent material, the touch sensor 10 may be positioned between the polarisers of the display stack 21. On the other hand, in an OLED display stack 21, it may not matter whether or not the touch sensor 10 includes a layer of birefringent material, so there is more design freedom to arrange the touch sensor layers where desired, e.g. some of the touch sensor layers interleaved with (or combined with) layers of the display stack 21. For example, in some embodiments the touch sensor 10 may use an existing layer (e.g., a layer found in a typical non-touch display stack, such as the colour filter layer or one of the polariser layers, etc.) of the display stack 21 as a substrate.

The touch sensor 10 may be similar to, and comprise similar components and functionality as, the touch sensor 10 described above with respect to FIG. 1. Depending on the embodiment, and/or operational needs, the touch sensor 10 may be a laminated layer within the display stack 21, or one or more of the components of the touch sensor 10 (e.g., fine line metal electrodes for sensing a touch input) may be deposited on an existing layer of the display stack 21. This may allow the touch sensing functionality to be included during the manufacturing of the display stack 21. In embodiments in which the touch sensor 10 is deposited on an existing layer of the display stack 21, the existing layer of the display stack 21 may function as the substrate for the touch sensor 10. In other embodiments, the touch sensor 10 may comprise its own substrate that is placed within the display stack 21. Depending on the type of display and/or the desired location of the touch sensor 10 within display stack, the substrate used for the touch sensor 10 may be made of a birefringent material or a non-birefringent material. In certain embodiments, having the touch sensor 10 within the display stack 21 allows for a display stack with touch sensing capability that is substantially free of any air gaps between the touch sensor 10 and display stack 21. As such, in certain embodiments, having the touch sensor 10 within the display stack 21 allows for a display stack with touch sensing capability that is thinner than a traditional display stack with a touch sensor added on top of the display stack.

Figure 3:
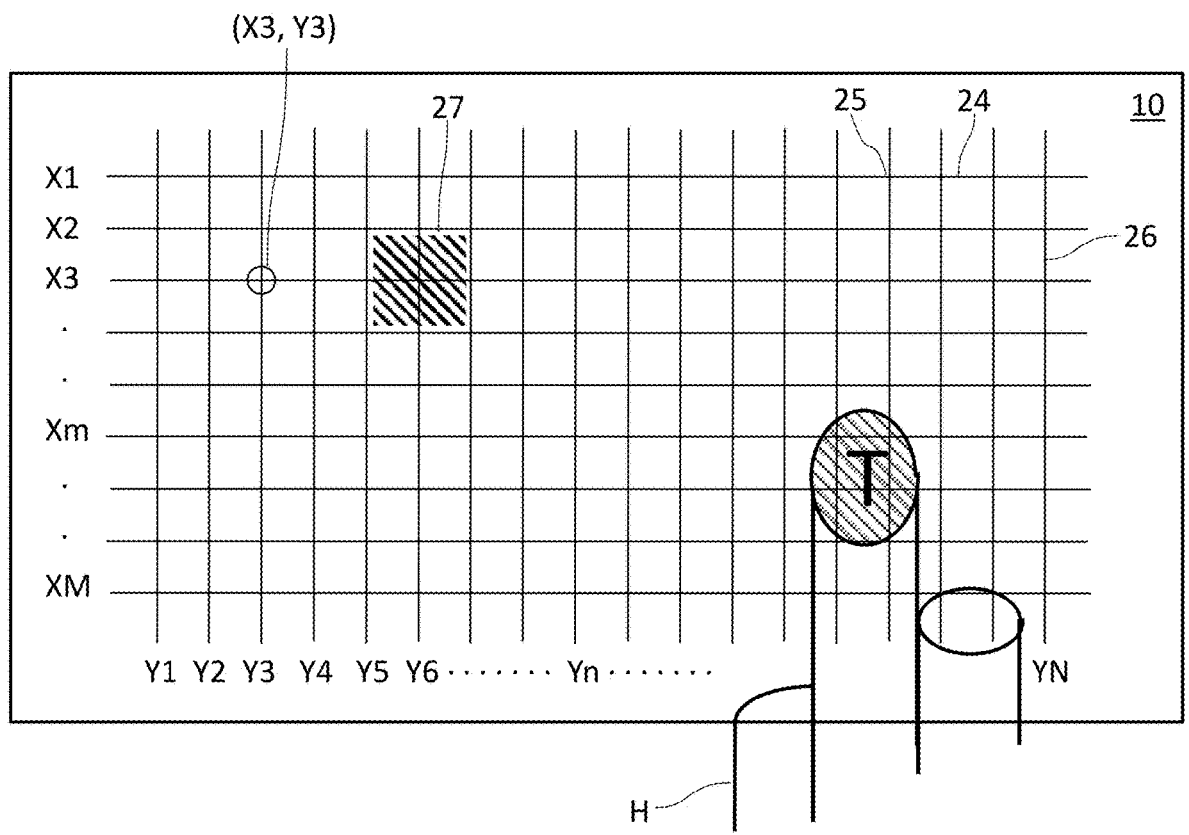
FIG. 3 is a schematic drawing in plan view of an example touch sensor according to embodiments of the disclosure.

FIG. 3 is a schematic plan view of an example touch sensor 10 according to embodiments of the disclosure which is of the grid type. There are two groups of parallel sensor electrodes, X electrodes 24 and Y electrodes 26. The X and Y electrodes are illustrated as extending orthogonal to each other, but other angles could be used, so long as the X and Y electrodes cross to form a suitable number and overall density of nodes 25, where nodes are defined by the crossing points of pairs of X and Y electrodes (as viewed in plan view). The node array thus forms a touch-sensitive area. An example node (X3, Y3) is marked in the figure. The number of nodes 25 will generally be the product of the number of X electrodes and Y electrodes—in the illustrated example there are M x N nodes, where M is the number of X electrode lines and N is the number of Y electrode lines. Each node, i.e. crossing point, 25 is associated with a sub-area 27 of the touch sensor into which X and Y electrode patterning can extend so that touches will generate signals that will be associated with that node. (No electrode patterning is shown in FIG. 3; only the so-called spines of the X and Y electrodes.) For example, in the figure, node (X3, Y6) has a possible associated sub-area 27 marked with bold hatching. Assuming that there are no crossings between X and Y electrodes except at the principal crossing-points 25 (which is the usual case), then the extent of the sub-area for an arbitrary crossing point between electrodes $X_n$ and $Y_n$ is defined by the area formed between electrodes $X_{n-1}$ and $X_{n+1}$ and $Y_{n-1}$ and $Y_{n+1}$, i.e. a block of four squares in FIG. 3. In some electrode patterns, touches anywhere within the sub-area will generate signals that will be associated with that node. However, with other electrode patterns, only a portion of the sub-area will be associated with the node. The X and Y electrodes are arranged either side of a dielectric layer (not visible in the figure), so they are vertically offset from each other by the thickness of the dielectric layer, vertical meaning orthogonal to the plane of the stack layers, i.e. in the figure perpendicular to the plane of the paper. If desired, it is possible to deposit the X and Y electrodes on the same side of a dielectric, substrate layer with thin films of insulating, dielectric material being locally deposited at the cross-overs to avoid shorting between the X and Y electrodes. A single electrode layer design of this kind is disclosed in US 2010/156810 A1, the entire contents of which are incorporated herein by reference. In the figure, a schematic touch T by a finger from a user's hand H is shown. From the illustration, it is clear that a single touch can often extend over several nodes—in the illustration the touch covers four nodes extending over two adjacent X lines and two adjacent Y lines. Having signals from at least two adjacent X electrodes and at least two adjacent Y electrodes respectively enables interpolation of the touch signals to be performed in both x and y directions in order to deduce the x, y touch coordinates. It will be understood that a crossing point is not actually a point in a geometric sense, but rather an area, since at the crossing point where an X and Y electrode cross there will be a finite area, as considered in plan view, over which the X electrode and the Y electrode overlap. In the case of orthogonal crossing of straight X and Y electrode portions of respective widths Wxc and Wyc, the overlap area will be the product of Wxc and Wyc.

Figure 4A:
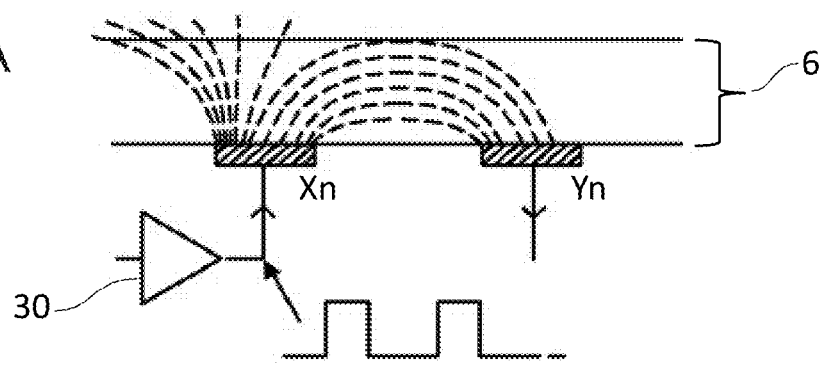
FIGS. 4A and 4B are schematic cross-sections through a touch panel showing the electric field distribution during a mutual capacitance measurement in the absence of a touch and in the presence of a touch respectively.
Figure 4B:
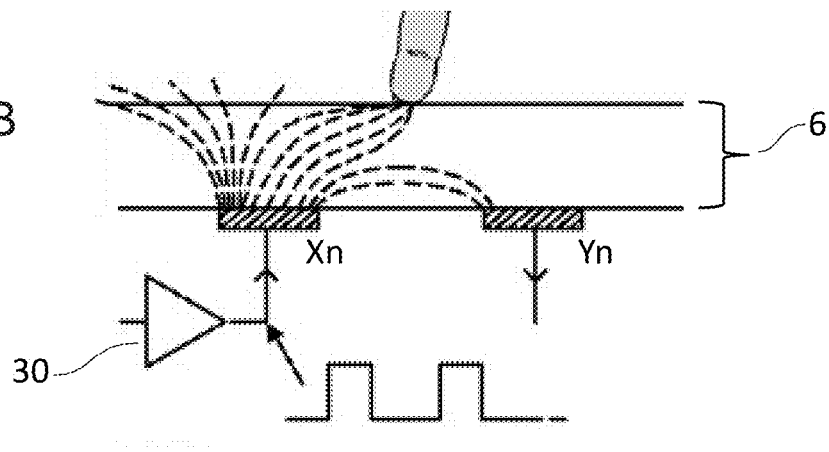

FIGS. 4A and 4B are schematic cross-sections through a touch panel 6 showing the electric field distribution during a mutual capacitance measurement in the absence of a touch and in the presence of a touch respectively. The cross-sections are through the touch panel in a plane perpendicular to the plane of the stack showing a mutual capacitance measurement involving an individual pair of X (drive) and Y (sense) electrodes: Xn, Yn. The drive electrode is driven with a train of pulses output by an X-drive amplifier 30 as shown. Electric field lines are shown schematically with the dashed lines. As can be seen from the schematic depiction, field strength at the touch surface is highest in the region adjacent the gap between the X and Y electrodes and decreases towards the interior of each electrode. The effect of a touch is evident from a comparison of FIGS. 4A and 4B, namely a touch draws away field and causes a reduction in the capacitively coupling between the drive and sense electrodes.

Figure 5:
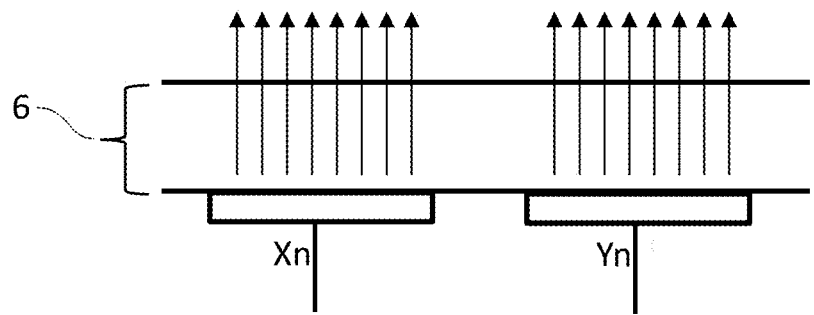
FIG. 5 is a schematic cross-section through a touch panel showing the electric field distribution during a self capacitance measurement.

FIG. 5 is a schematic cross-section through a touch panel 6 showing the electric field distribution during a self capacitance measurement. FIG. 5 shows the same touch panel as FIGS. 4A and 4B for a self capacitance measurement involving the same pair of X and Y electrodes: Xn, Yn. Electric field lines are shown schematically with the arrow-headed lines. As can be seen from the schematic depiction, field strength across the node area is substantially constant. In other words there is no, or only insubstantial, lateral field non-uniformity.

Figure 6:
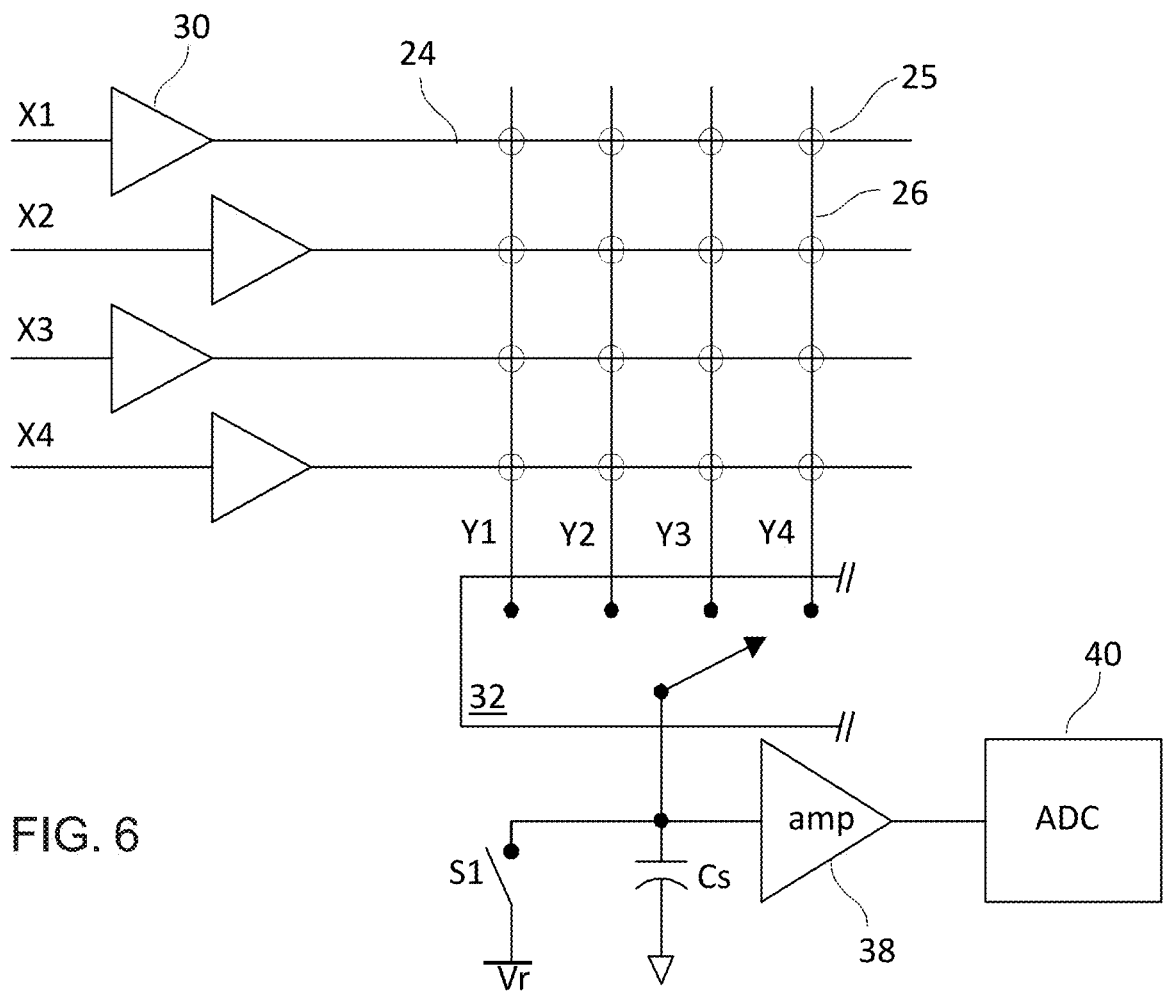
FIG. 6 is a schematic plan view of the low index X and Y lines of the grid-type touch sensor 10 of FIG. 3 together with some of the principal parts of the charge measurement or collection circuitry.

FIG. 6 is a schematic plan view of the low index X and Y lines of the grid-type touch sensor 10 of FIG. 3 together with some of the principal parts of the charge measurement or collection circuitry. The X and Y lines 24 and 26 are illustrated, which cross at the nodes 25. The X lines 24 are driven by respective X-drive circuit elements 30, depicted as amplifiers. The Y lines 26 are connected at one end to a sample switch 32 via which each Y line is connectable to a charge measurement circuit. The sample switch 32 is schematically drawn to indicate that each Y line is connectable one-at-a-time to a single charge measurement circuit, but it will be understood that multiple charge measurement circuits may be provided to service groups of Y lines in parallel. In some embodiments, each Y line may have a dedicated charge measurement circuit. The components of the charge measurement circuit illustrated in FIG. 6 are as follows. A sampling capacitor Cs having a known or constant value, normally much larger than the value of Cx. One of the two terminals of Cs, hereinafter called the proximal terminal, is connected to Cx. The second terminal of Cs is sometimes referred to hereinafter as the distal terminal. The voltage across Cs is used as an indication of the value of Cx. A switch S1 is provided for connecting the sampling capacitor Cs to a voltage Vr and thereby inducing a charge-transfer event. An amplifier 38 is provided for amplifying the voltage associated with the charge accumulated on the sampling capacitor Cs, when that charge is read out. An ADC 40 is provided on which the capacitive sensing voltage is accumulated.

There 'Y' gate drives (Y1 ... Y4) are active-high. Only one Y line is used during sensing on a particular node, although in practice all Y lines will be measured simultaneously. The chosen Y line goes high just before an X-drive edge, and goes low again a short time after the X-drive edge. The Y line is used to gate on an analogue switch to capture charge coupled through a node onto the sampling capacitor Cs.

Figure 7:
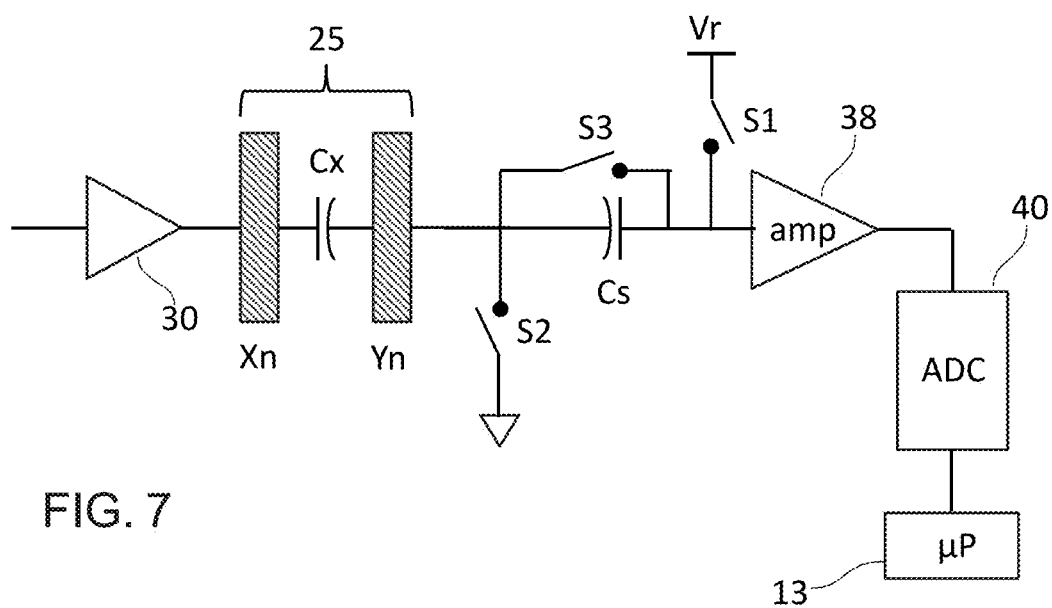
FIG. 7 is a schematic circuit diagram showing the charge measurement circuitry for a single node in some more detail than in FIG. 6.

FIG. 7 is a schematic circuit diagram showing the charge measurement circuitry for a single node in some more detail than in FIG. 6. The coupling capacitance between X and Y electrodes is represented by Cx. In certain embodiments, Cs is a large value capacitor, typically in the range of 1-50 nF and the voltage rise captured on Cs after each X-drive edge is quite small, on the order of a millivolt, while changes due to touch are on typically the order of tens of microvolts. The X pulse can be repeated in a burst consisting of up to, for example, several hundred pulses to build up the voltage (and the change in voltage due to touch) to a larger value. Longer bursts increase system gain by collecting more charge; gain can thus be digitally manipulated to achieve the required sensitivity on a node-by-node or row-by-row basis during scanning.

The ADC 40 is connected to the processor (μP) 13, so that the processor 13 can read the latched voltage value from the ADC 40 whenever desired. In this respect, it is noted that voltage can be allowed to accumulate on the ADC 40 over multiple measurements, e.g. multiple measurements that form a burst in burst mode, or the processor 13 can read off the ADC 40 after each measurement event, e.g. in an extreme case after every cycle or every burst of cycles. It is also noted that in burst mode, an ADC 40 could be substituted for a simple comparator, which is all that is needed for measuring when a threshold voltage has been reached. Generally it will be quicker to allow at least some voltage accumulation over multiple measurements in the ADC 40 to reduce the number of ADC reads by the processor, however the division of responsibility between the ADC and processor in the role of summing voltage contributions is arbitrary and hence interchangeable from a functional point of view.

The switch S1 is closed in order to drive electric charge through both a sampling capacitor, Cs, and the capacitance at the node 25 that is to be measured, denoted Cx. When S1 is subsequently opened, this leaves residual charges on both Cs and Cx. Kirchhoff's current law and the principle of charge conservation dictate that the accumulated charges Qs and Qx, are equal. However, because Cs>>Cx, a greater residual voltage is found on Cx, and conversely, a lesser voltage is measured on Cs. Another way of expressing the same point is to say that, when switch S1 is closed, Cs and Cx form a capacitive voltage divider.

A switch S2 is used to clear the voltage and charge on Cs, and also to allow the measurement of Vcs, the voltage across Cs. A reset switch S3 is provided, which when open allows gating of the sampling switch S1 to allow charge to flow from the rising edge of X into the sampling capacitor Cs. It may be noted that the use of S2 allows S1 to be cycled repeatedly in order to build up the charge on Cs. This provides a larger measurable voltage value and greater accuracy, increasing sense gain or sensitivity without the use of active amplifiers. A third switch S3 acts as a reset switch and is used to reset the charge on Cs prior to beginning a charge-transfer burst as explained below.

The following table shows a switching sequence of the three switches S1, S2, S3 as used to obtain a capacitive sensing measurement. Symbol "X" represents a switching status being close while blank represents a switching status being open. A controller 12 controls the switching sequence and also the operation of the ADC 40. Signal processing in the controller 12 is performed by processor 13.

TABLE 1

| STEP | S1 | S2 | S3 | FUNCTION |
|------|----|----|----|----------|
| A    |    | X  | X  | reset all |
| B    |    |    |    | dead time |
| C    | X  |    |    | charge-transfer |
| D    |    |    |    | dead time |
| E    |    | X  |    | hold and go to Step B to accumulate |
| F    |    | X  |    | measure (after looping B-to-E 'N' times) |

A burst mode of operation will loop from B-to-E a desired number of times, whereas a non-burst mode, i.e. using continuous charge-transfer, will not loop back from E to B, but simply run through the sequence A to F.

The table shows an example switching sequence. In step A, switches S2 and S3, which were previously in their respective open states, are closed to clear charge on Cs and Cx. After a suitable pause in step A, switch S1 is closed to drive charge through Cs and Cx (Step C). The resulting first voltage increment across Cs is defined by the capacitive voltage divider equation:

$$\Delta Vcs(1) = VrCx/(Cs+Cx) \tag{1}$$

where Vr is the reference voltage connected to S1.

In Step E, S2 is closed, and ΔVcs appears as a ground referenced signal on the positive, distal, terminal of Cs. Dead time steps B and D are employed to prevent switch cross-conduction, which would degrade the charge build up on Cs. Dead time can be short, e.g. a few nanoseconds. Steps B through E may be repeated in a looping manner, to provide a "burst" of charge-transfer cycles. After a suitable charge-transfer burst length, the charge-transfer cycle is terminated and Vcs is measured by the ADC, in Step F, with switch S2 closed and the other switches open. Following the measurement of Vcs, switch S3 may also be closed to reset Cs in preparation for the next charge-transfer burst.

This method is explained in greater detail hereinafter.

During the repeating loop of steps B through E, voltage builds up on Cs but not Cx. Cx is continuously being discharged in step E, and hence Cx cannot build up an increasing amount of charge. However, Cs freely accumulates charge, so that the resulting incremental voltage is dependent on the difference in the voltages Vr and Vcs as follows:

$$\Delta Vcs(n) = K(Vr - Vcs(n-1)) \tag{2}$$

where
  Vr is a supply voltage that may be a fixed reference voltage;
  n is the charge-transfer cycle number; and $$K = Cx/(Cs+Cx)$$

The final voltage across Vcs is equal to the sum of the first value of Vcs plus all subsequent values of ΔVcs. That is:

$$Vcs(N) = \Delta Vcs(1) + \Delta Vcs(2) + \Delta Vcs(3) + \ldots + \Delta Vcs(N) \quad (3)$$

or $$Vcs(N) = 1\Sigma \Delta Vcs(n) = K\Sigma(\Delta Vr - Vcs(n-1)) \quad (4)$$

where the summation runs over the range from n=1 to n=N.

During each charge-transfer cycle, the additional incremental voltage on Vcs is less than the increment from the prior cycle and the voltage build-up can be described as a limiting exponential function:

$$Vcs(n) = Vr - Vre^{-dn} \quad (5)$$

where d is a time scaling factor.

In practice, a burst is terminated before Vcs saturates at Vr, since, owing to the exponential rise of the accumulated voltage, most of the useful signal is collected in the early part of the rise. The charge-transfer burst can be concluded after a fixed or after a variable number of cycles, or after a certain amount of time has elapsed.

Further details and alternative capacitive sensing circuits which may be used in embodiments of the invention are disclosed in WO 00/31553 A1 (Harald Philipp), the entire contents of which are incorporated herein by reference.

The arrangement of FIG. 6 and FIG. 7 is also generally suitable for performing a self capacitance measurement bearing in mind the following comments. Referring to FIG. 7, in a self capacitance measurement, a touching object will substitute for one of the X and Y electrodes, since the capacitance that is being measured is that between the touch and one electrode. For measuring self capacitance on the X electrodes, the drive pulses could be supplied as illustrated in FIG. 6, but with the sensing also taking place on the X electrodes (not on the Y electrodes as shown in FIG. 6). For measuring self capacitance on the Y electrodes, the drive pulses could be supplied to the Y electrodes (not to the X electrodes as illustrated in FIG. 6), and the sensing will take place also on the Y electrodes as illustrated in FIG. 6. The circuit of FIG. 7 is also generally suitable for performing self capacitance measurements, although one of Xn/Yn will be a touching object, not an electrode. An additional beneficial measure for measuring self capacitance is to supply drive pulses to both X and Y electrodes simultaneously when making a measurement on either the X or Y electrodes. By driving both X and Y electrodes simultaneously, they both have the same time-varying voltages on them which minimises any unwanted mutual capacitive coupling between them, thereby giving a more sensitive self capacitance measurement. It is also noted that, in principle, with a sufficient number of integrators, it would be possible to measure on all X and Y, although in practice it is not usually a good design choice to provide so many integrators, so measurement is only carried out on one of X and Y at any one time.

Figure 8:
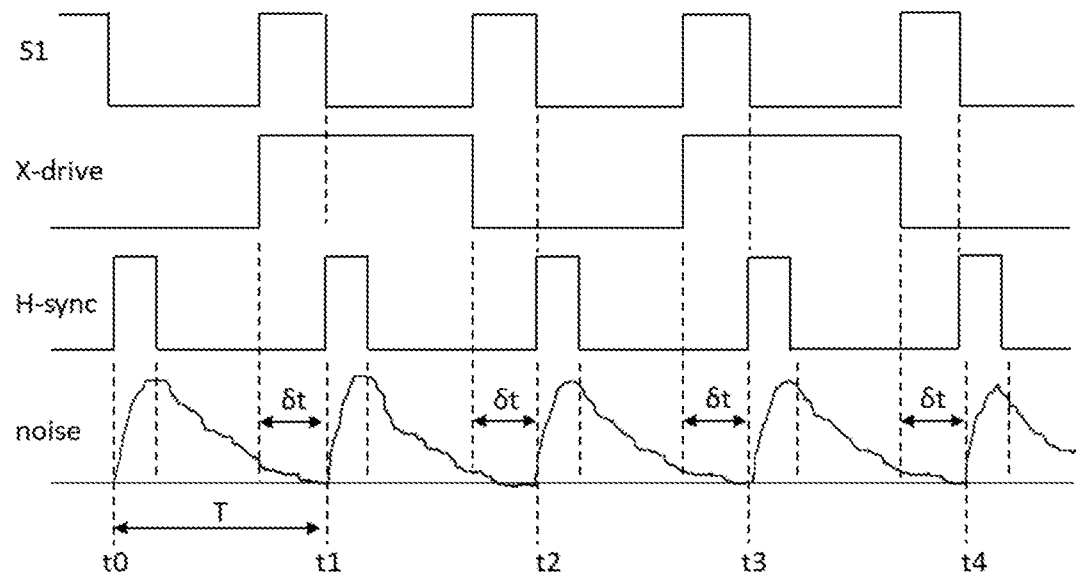
FIG. 8 is a schematic timing diagram showing how the collection of the touch sensor signal takes place relative to the display drive signals in a touch screen during a conventional mode of operation.

FIG. 8 is a schematic timing diagram showing how the collection of the touch sensor signal takes place relative to the display drive signals in a touch screen. The timing diagram shows the H-sync drive signal of the display, the noise induced by the display in the capacitive sensing circuit, the X-drive signal of the capacitive sensor and the drive signal for the sampling capacitor switch S1, which shows when during the cycles the capacitive touch signal is collected. For the display, the H-sync signal is a series of pulses for refreshing the display that repeats with a period T. The noise induced by the activity of the display in each display cycle is shown schematically with a rise, initiated by the rising edge of the H-sync signal, and subsequent peaking and then decay. The noise sources will be each of the various display activities that take place in the cycle and may have an arbitrary functional form. The main peak in the noise is from the driving of the source electrodes of the display, and there may be subsequent smaller peaks (not shown) in the course of each cycle from other drive events, such as from driving the gate electrodes of a thin film transistor (TFT) in an OLED display. The touch sensor measurement is timed synchronously with the display drive to take place during a time window 'δt' at the end of the display drive cycle so as to finish before the next rising edge of the H-sync pulse. The capacitive signal collection is indicated by the switch S1 signal and the X-drive signal. The X-drive signal rising and falling edges initiate charge transfer, and a charge transfer window of duration 'δt' is defined by the time during which the switch S1 is closed, starting with the rising/falling edge of the X-drive signal and ending just before the onset of the next H-sync signal. With this relative timing between the display and the capacitive sensor, the capacitive sensing takes place at the end of the display cycle when display noise is at its lowest.

FIG. 8 shows a specific example in which each measurement is based on a pair of samples taken from successive positive- and negative-going edges of the X-drive signal and thus takes place over two successive H-sync cycles. This follows the known approach whereby positive and negative signal pairs are acquired, the two signals being averaged to cancel out any polarity-based signal contributions. With the use of paired negative and positive edges, the X-drive pulse at time t1−δt to t2−δt is for one sensor row, the X-drive pulse at time t3−δt to t4−δt is for the next (or another) sensor row and so forth, so as to move through the whole sensor area and collect a full frame of sensor data.

In alternative, simplified embodiments, only the positive-going edge or only the negative-going edge of the X-drive signal could be timed to coincide with the closing of the sampling switch S1, i.e. with the onset of the sampling window, in which case a single touch sensor measurement would take place in one H-sync cycle, i.e. one charge accumulation on the sampling capacitor Cs. That is, only one type of edge of the X-drive pulse is used to create the transient field flows that form the basis of the capacitive measurement.

Figure 9:
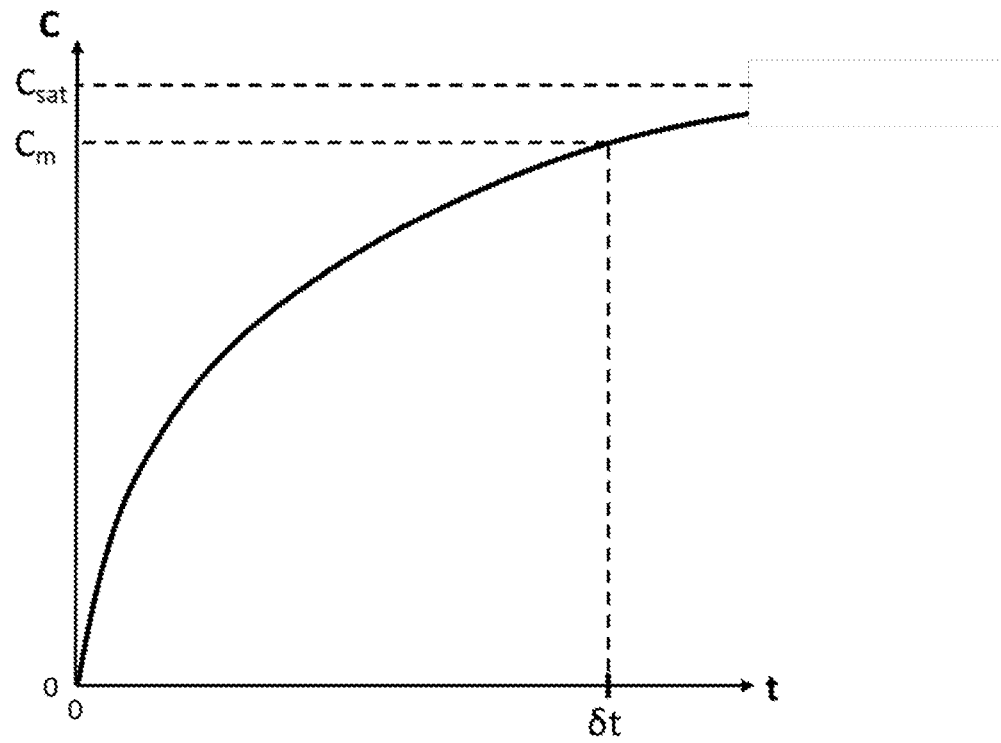
FIG. 9 is a graph showing how, in the conventional mode of operation of FIG. 8, charge 'C' collects during a sampling period 'δt', resulting in a charge 'Cm' accumulating by the end of the sampling period.

FIG. 9 is a graph showing how, in the mode of operation of FIG. 8, charge 'C' collects during a sampling period 'δt', resulting in a charge 'Cm' accumulating by the end of the sampling period, where 'Cm' is an appreciable fraction of the total amount of charge 'Csat' transferred onto 'Cs', perhaps 70, 80 or 90%. Charge 'C' collects at the ADC 40 during the sampling period 'Δt' and is read out into the processor 13 at the end of the sampling period, or several times during the sampling period with each contribution being summed by the processor 13. The touch sensor is designed such that time 'δt' is long enough to allow a high proportion of the charge induced at each node 25 to be collected at the ADC 40 and thus form part of the measurement signal. In FIG. 9, this can be inferred from the exponential rise having nearly completed. It will be understood that the collection period 'δt' may be made up of many bursts, as described above, and as shown in FIG. 4 of WO 00/31553A1 (Harald Philipp), the contents of which are incorporated herein by reference.

Whereas FIGS. 8 and 9 show a standard mode of operation, a novel mode of operation is now described with reference to FIGS. 10 and 11 which are to be compared with FIGS. 8 and 9 respectively.

Figure 10:
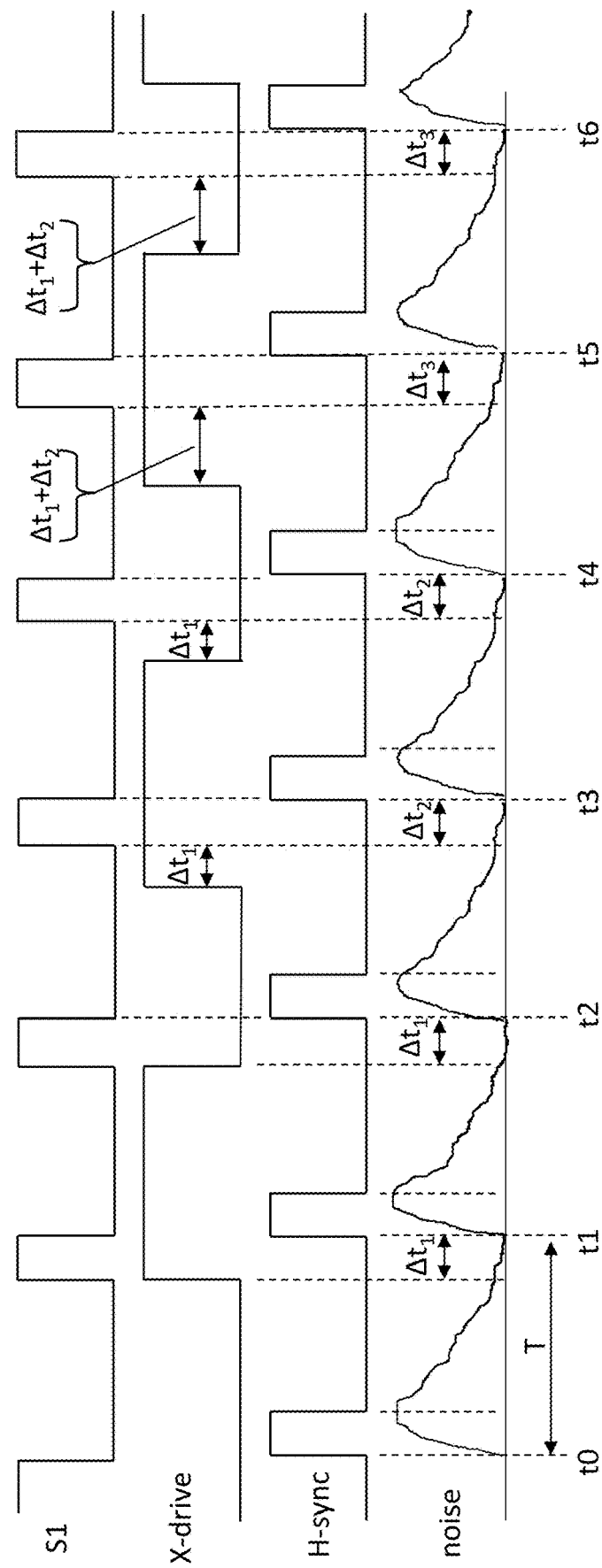
FIG. 10 is a schematic timing diagram showing how the collection of the touch sensor signal takes place relative to the display drive signals in a touch screen during a novel mode of operation embodying the invention.

FIG. 10 is a schematic timing diagram showing how the collection of the touch sensor signal takes place relative to the display drive signals in a touch screen during a novel mode of operation embodying the invention. The H-sync signal is a series of pulses for refreshing the display that repeats with a period T. The noise induced by the activity of the display in each display cycle is shown schematically with a rise, initiated by the rising edge of the H-sync signal, and subsequent peaking and then decay. The noise sources will be each of the various display activities that take place in the cycle and may have an arbitrary functional form. The main peak in the noise is from the driving of the source electrodes of the display, and there may be subsequent smaller peaks (not shown) in the course of each cycle from other drive events, such as from driving the gate electrodes of a thin film transistor (TFT) in an OLED display.

In contrast to the standard mode of operation shown in FIG. 8, the single touch sensor measurement is performed over multiple pairs of H-sync cycles, instead of in one pair of H-sync cycles. Specifically, the integration of the charge induced by a touch is summed from two or more charge collection events that take place in different cycles and in time windows at different phase offsets from the H-sync signal. FIG. 10 shows a specific example in which a single measurement based on the positive-going edge of the X-drive signal takes place over three H-sync cycles and a single measurement based on the negative-going edge of the X-drive signal that takes place over three further H-sync cycles that are interleaved with the cycles associated with positive-going X-drive signal edges. This follows the known approach whereby positive and negative signal pairs are acquired, the two signals being averaged to cancel out any polarity-based signal contributions. In alternative, simplified embodiments, only the positive-going edge or only the negative-going edge of the X-drive signal could be timed to coincide with the closing of the sampling switch S1, i.e. with the onset of the sampling window, in which case a single touch sensor measurement would take place over successive H-sync cycles.

A touch sensor signal is built up as follows, referring to FIG. 10 from left to right.

In the first illustrated cycle, towards the end when display-induced noise is presumed to be acceptably low, at time $t1-\Delta t1$, accumulation of touch signal is initiated by closing switch S1 which coincides with a rising-edge of the X-drive signal (on the relevant sensor row). Accumulation of charge is terminated at time t1 (or just before) when the rising edge of the next H-sync pulse occurs.

In the second cycle, the timings are similar to accumulate signal on the negative-going X-drive pulse (of the same sensor row). That is, at time $t2-\Delta t1$, accumulation of touch signal is initiated by closing switch S1 which coincides with a falling-edge of the X-drive signal (on the same sensor row as for the previous cycle). Accumulation of charge is terminated at time t2 (or just before) when the rising edge of the next H-sync pulse occurs.

In the third cycle, the timings start to deviate from those of the standard mode of operation. The X-drive signal rising edge (still of the same sensor row as in the first and second cycles) is timed at $t3-\Delta t1-\Delta t2$. The closing of switch S1 is delayed relative to the X-drive signal and occurs at $t3-\Delta t2$, i.e. with a delay of $\Delta t1$ from the X-drive edge. During the time period $(t3-\Delta t1-\Delta t2)$ to $(t3-\Delta t2)$, switch S2 is closed so that charge induced by the X-drive edge at $(t3-\Delta t1-\Delta t2)$ is sinked to earth and not collected at the sampling capacitor Cs. After switch S1 is closed (and S2 is opened) at time $t3-\Delta t2$, charge accumulates on the sampling capacitor Cs. Accumulation of charge is terminated at time t3 (or just before) when the rising edge of the next H-sync pulse occurs. The X-drive pulse edge is thus advanced by $\Delta t1$ relative to the start of the sampling period as defined by closing of switch S1.

The fourth cycle has similar timings to the third cycle, but for the negative-going X-drive pulse (still of the same sensor row as in the first to third cycles). The X-drive signal falling edge is timed at $t4-\Delta t1-\Delta t2$. The closing of switch S1 is delayed relative to the X-drive signal and occurs at $t4-\Delta t2$, i.e. with a delay of $\Delta t1$ from the X-drive edge. During the time period $(t4-\Delta t1-\Delta t2)$ to $(t4-\Delta t2)$, switch S2 is closed so that charge induced by the X-drive edge at $(t4-\Delta t1-\Delta t2)$ is sinked to earth and not collected at the sampling capacitor Cs. After switch S1 is closed (and S2 is opened) at time $t4-\Delta t2$, charge accumulates on the sampling capacitor Cs. Accumulation of charge is terminated at time t4 (or just before) when the rising edge of the next H-sync pulse occurs.

The fifth cycle advances the X-drive edge still further to occur at time $(t5-\Delta t1-\Delta t2-\Delta t3)$. The sample switch S1 is closed (and S2 opened) at $t5-\Delta t3$ to start charge accumulation on the sampling capacitor Cs. The X-drive edge induced charge prior to that is sinked to earth through a closed switch S2. The X-drive pulse edge is thus advanced by $\Delta t1+\Delta t2$ relative to the start of the sampling period as defined by closing of switch S1.

The sixth cycle proceeds with similar timing to the fifth cycle to collect charge from the falling edge of the X-drive pulse.

Here it is noted that the same X line, i.e. the same sensor row electrode, is being driven for all six, i.e. for all 3 pairs, of display cycles illustrated in FIG. 10, so FIG. 10 represents a single charge measurement. In contrast, the four cycles of FIG. 8 represent two charge measurements of two cycles each, i.e. two pairs. In the example of FIG. 10, it will be appreciated that the illustrated timings of the 6 cycles can repeat unchanged for each row, that is cycle 7 will have the same timings as cycle 1, cycle 8 as cycle 2 and so forth.

Figure 11:
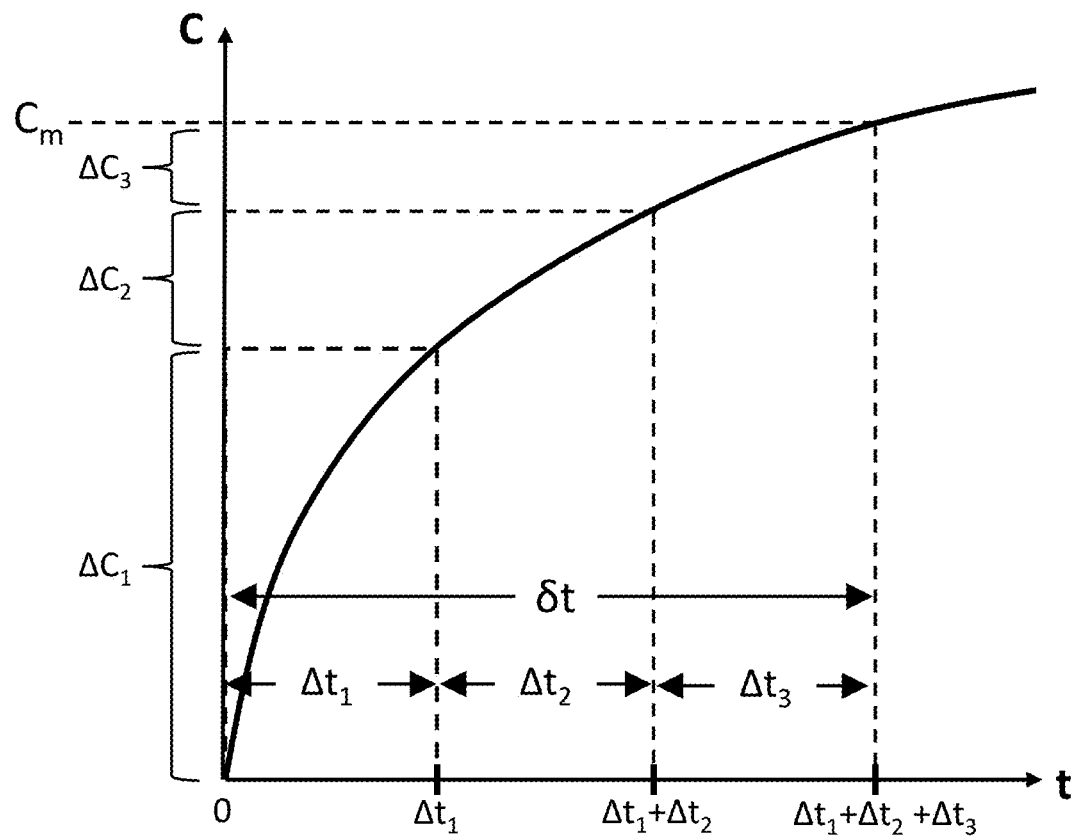
FIG. 11 is a graph showing how, in the novel mode of operation of FIG. 10, charge 'C' is collected in separate parts over multiple separate H-sync cycles using sampling periods $\Delta t_1$, $\Delta t_2$ and $\Delta t_3$ resulting in an aggregate charge 'Cm' accumulating made up of three contributions $\Delta C_1$, $\Delta C_2$ and $\Delta C_3$ respectively.

FIG. 11 is a graph showing how, in the novel mode of operation of FIG. 10, charge 'C' is collected in separate parts over multiple separate H-sync cycles using sampling durations $\Delta t_1$, $\Delta t_2$ and $\Delta t_3$ each of which are associated with different H-sync cycles. As a result an aggregate charge 'Cm' is accumulated made up of three contributions $\Delta C_1$, $\Delta C_2$ and $\Delta C_3$ respectively.

For ease of subsequent discussion, let us assume that $\Delta t_1=\Delta t_2=\Delta t_3=\Delta t$ although they can each be chosen independently if desired. Comparing FIG. 11 with FIG. 9, let us also assume that $\delta t=\Delta t_1+\Delta t_2+\Delta t_3=3\Delta t$. What we see then is that with the timings of FIG. 10, the sensing measurements take place in a time window of duration $\Delta t$ at the end of the display cycle, whereas with the timings of FIG. 8, the sensing measurements take place in a time window of duration $3\Delta t$ at the end of the display cycle, i.e. over a duration that is three times longer. The sensing measurements of FIG. 10 therefore take place later in the cycle when there is lower display-induced noise. This is because the signal acquisition is made in multiple components over multiple display cycles, these components being summed either in analogue fashion at the input of the ADC 40, or in the processor 13 if the ADC is read out by the processor 13 after each display cycle (or each pair of display cycles, if negative and positive X-drive edge pairs are collected in successive display cycles). The capacitive sensor signal is therefore collected in a more benign noise environment than with the approach of FIG. 8.

It will also be appreciated that the order in which the accumulation components are collected is arbitrary. In FIG. 10, we showed that the offsets, i.e. time delays, between the X-drive signal edge and the closing of switch S1, i.e. the start of charge accumulation, incrementally increased from zero up to the maximum offset, i.e. specifically 0, then $\Delta t_1$, then ($\Delta t_1 + \Delta t_2$), so that the amount by which the X-drive edge is advanced relative to the sampling window is incrementally increased in steps from zero to a maximum value. However, the offsets could proceed in any desired order. To follow the proposed approach, the minimum number of different offsets is two, i.e. the signal is collected in two components over two different display cycles. In most embodiments, one of the offsets will be zero or nearly zero to capture the steepest rise in the exponential accumulation of charge on the sampling capacitor. However, in some embodiments, if there is an excess of signal which might otherwise saturate the ADC, the signal close to zero offset could be dumped, i.e. sinked to earth, in which case all offsets would be non-zero.

In FIG. 10, we illustrated a capacitive sensing measurement made up of three offset components by way of example. The number of components could also be 2, 4, 5, 6, 7, 8, 9, 10 or any desired number. Moreover, the durations of each $\Delta t_1, \Delta t_2, \Delta t_3, \ldots \Delta t_n$ can be chosen independently of each other and with magnitudes that are convenient and desirable. Given the exponential rise in the accumulated charge at Cs and voltage at the ADC, the timing deltas $\Delta t_n$ could be chosen having regard to the exponential form so that each of $\Delta C_1, \Delta C_2, \Delta C_3, \ldots \Delta C_n$ are expected to be at least roughly equal. Alternatively, the timing deltas $\Delta t_n$ could be chosen to be equal to each other.

It will also be understood that each charge accumulation could be in a single actuation of switch S1, or in a fixed or variable number of actuations in so-called burst mode, as is well known in the art.

A mutual capacitance measurement in a grid-type touch sensor can therefore be performed in a touch screen device incorporating a display and a capacitive touch sensor, the device comprising:

a display drive signal generator operable to output display drive signals at a certain frequency to the display, so that the display is driven in cycles to form image frames on a display area of the display, each image frame being created by a plurality of display drive cycles;

a set of X sensor electrodes and a set of Y sensor electrodes arranged to cross each other to form a two-dimensional array of sensing nodes which defines a touch sensitive area, wherein the touch sensitive area and the display area are at least partly co-extensive;

an X-drive pulse generator operable to supply X-drive pulses to the X sensor electrodes;

one or more sampling capacitors for accumulating charge from the Y electrodes resulting from capacitive coupling at the sensing nodes between crossing X and Y sensor electrodes initiated by edges of the X-drive pulses;

a sampling switch whose switch state enables a charge accumulation to take place on the sampling capacitor(s) initiated by an X-drive pulse edge;

a voltage reader for measuring a voltage value associated with a charge accumulation on the sampling capacitor(s); and a controller operable to read out from the voltage reader and to perform capacitive touch sensor measurement according to a mode of operation in which a charge measurement from a single sensing node is made up of a plurality of at least first and second charge accumulations at the sampling capacitor(s), wherein the at least first and second charge accumulations take place in different display cycles and with at least first and second different time delays from the X-drive pulse edge (whose induced charge transfer the sampling capacitor accumulates in each charge accumulation).

A self capacitance measurement can also be performed in the same grid-type touch sensor as just described in that the drive pulse generator supplies drive pulses to both the X sensor electrodes and the Y sensor electrodes, and the sampling capacitor(s) accumulate charge resulting from drive-pulse induced capacitive coupling between, on the one hand, the X and Y sensor electrodes and, on the other hand, touches.

Self capacitance measurements can also be performed using the proposed approach in a matrix-type touch sensor.

To summarise, both for mutual and self capacitance measurements, the proposed novel mode of operation subdivides a single charge measurement into multiple charge accumulations which take place in different display cycles and at different time delays from the drive pulse edge responsible for the charge transfer. By subdividing the measurement into multiple charge accumulations, the amount of time needed in each display cycle for performing the touch sensor measurement can be reduced, so that the touch sensor measurement can be confined to a shorter time window in each display cycle when it is expected display-induced noise will be at its lowest. The temporal separation in each display cycle between display drive activity and touch sensor activity can therefore be increased. In the illustrated example of FIG. 10, the different time delays between different ones of the charge accumulations are realised by advancing the timing of the drive pulse edges within the display cycle, while keeping the timing of the sampling switch control, i.e. the charge accumulation, anchored as close as possible to the end of the cycle where noise is expected to be at a minimum. With this approach, if the different charge accumulation periods are the same, then the sampling window will remain unchanged from cycle to cycle with only the drive pulse edge moving. It will be understood that the charge accumulations can be arranged to be at any desired part of the display cycle, so the timings could, for example, be configured during device set-up, or even during use, so that the charge accumulation takes place in what is deemed or measured to be the lowest noise part of the display cycle, which in the examples described is at the end of each display cycle, but in some applications could be elsewhere in the display cycle. Each display will have its own characteristic noise signature as a function of cycle duration, and the proposed design allows the charge accumulation to be fixed at any part of the display cycle that is desired, and with any desired duration, since the designer can set the phase duration of the charge accumulation in each cycle to be longer or shorter by decreasing or increasing the number of cycles over which one full charge accumulation occurs.

Our test results confirm that with the proposed mode of operation it is possible to improve sensitivity, i.e. increase the signal-to-noise ratio, compared with a standard mode of operation for the same measurement time. In particular, sensitivity across the touchscreen is more uniform, avoiding a large drop off in sensitivity as one moves away from one edge of the screen towards the middle in the Y direction. In effect the proposed novel mode of operation reconstructs a long charge time measurement from several short measurements, where the short measurements are each taken in a low noise part of the display cycle compared with a standard mode of operation where a long charge time measurement would extend into the display noise tail. Our test results show improvements for both grounded and floating touches. It is noted that the novel mode of operation can be detected through the novel drive sequences. In particular, our proposed mode of operation addresses the specific problems that are arising in next generation OLED displays, for which the time available for making capacitive touch sensor measurements is ever reducing, the noise level increasing, and the sensitivity variation across the display and touch sensing area increasing because of the higher loads.

It will be understood that the proposed measures for integrating the capacitive touch signal in multiple parts can be applied to a wide variety of types of touch sensor, since the proposed measures relate to how the signal is collected, not the structure of the touch screen, so can be implemented regardless of factors such as: touch sensor electrode pattern design; whether the touch sensor is of the grid type or the matrix type; whether the touch sensor is being operated in a mutual capacitance or self capacitance mode; the kind of display, e.g. OLED, LCD, in-cell, on-cell etc.

Stack Configurations

By way of example we now describe various specific stack implementations for LCD and OLED touch screens. In these implementations, it will be appreciated that one or more adhesive layers (e.g., OCA) may be used to bind layers of the display and touch sensor stack together, but these are not illustrated. Moreover, in these implementations, it will be understood that the touch panel is optically transparent in the visible region in order to be suitable for display applications and is made of a resilient material suitable for acting as the touch surface, such as for example a suitable glass or plastics material. Suitable plastics materials include polycarbonate (PC) and polymethyl methacrylate (PMMA). Further, it will be understood that embodiments may also be realised with other stack implementations, such as for example those described in US 2014/0226089 A1 (Atmel Corporation) and US 2016/259481 A1 (LG Electronics, Inc.), the entire contents of which are incorporated herein by reference.

FIG. 12 shows a sensor and display stack of an on-stack LCD embodiment of the disclosure. An on-stack design refers to the fact that the touch sensor is arranged on top of and is a separate sub-assembly from the display, each operating effectively independently. The LCD display stack starts with a backlight unit, then a bottom polariser and a glass layer to act as a substrate for the thin film transistors (TFTs). The TFTs together with their addressing and other electrodes, referred to as metal, are arranged in top of the TFT glass. It will be understood that reference to metal includes any suitable metallically conductive material, it is often being the case that ITO is used (i.e. a non-metal), since it is transparent and therefore suitable for display applications. For other applications, the electrode material may be opaque. The next layer is the liquid crystal layer followed by a colour filter layer. It will be appreciated that suitable spacers will be provided to maintain a design thickness for the liquid crystal layer. Next there is a black matrix layer for contrast enhancement, colour filter glass, and finally a top polariser. It will be appreciated that additional layers, such as adhesive, coatings and so forth may also be included as desired. Moreover, some of the recited layers could be omitted, for example the black matrix. A simpler structure would also result if the display was monochrome. The touch sensor stack is arranged on top of the display stack and commences with a substrate, made of a material such as a glass material (e.g. an alkali aluminosilicate glass) or a plastics material (e.g. PET) for example, on which the X electrodes are deposited. The X electrodes may be embedded in a dielectric matrix, such as an adhesive layer. On top of the X electrodes there is a dielectric and then the Y electrodes. It will be appreciated that in a single layer design, the substrate would be the dielectric and the X & Y electrodes would be arranged thereon, thereby removing two of the illustrated layers. There then follows an optional decoration layer followed by a touch panel. The touch panel may be a glass or a plastics material. Moreover, the touch panel may be coated, e.g. with an anti-scratch material for increased hardness and/or wear resistance.

Figure 13:
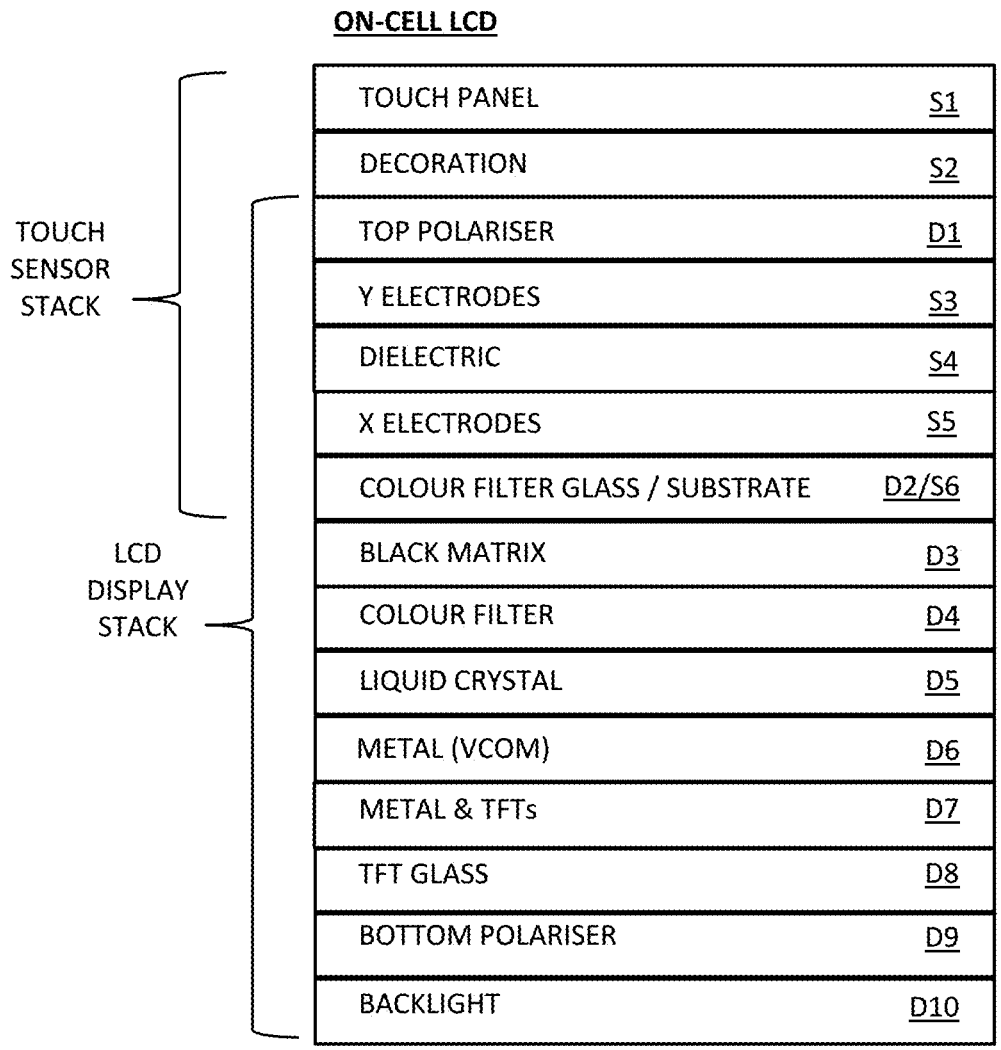
FIG. 13 shows a sensor and display stack of an on-cell LCD embodiment of the disclosure.

FIG. 13 shows a sensor and display stack of an on-cell LCD embodiment of the disclosure. The term on-cell refers to the fact that the touch sensor uses the uppermost display stack layer, namely the colour filter glass, as the substrate for the initial layer of the sensor stack, namely the X electrodes. Compared with the on-stack design of FIG. 12, the only other change is that the top polariser has been moved to be above the touch sensor layers for the X and Y electrodes which reduces the visibility of the touch sensor electrode pattern.

Figure 14:
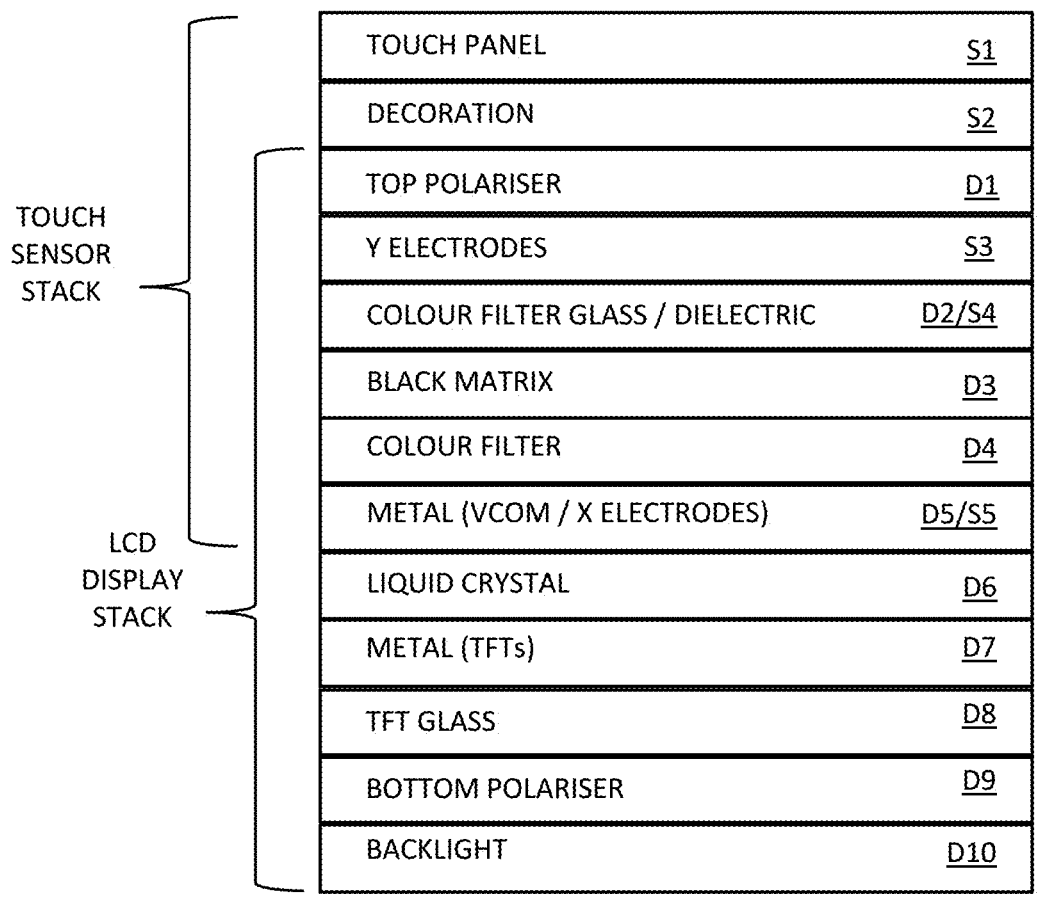
FIG. 14 shows a sensor and display stack of a hybrid in-cell LCD embodiment of the disclosure.

FIG. 14 shows a sensor and display stack of a hybrid in-cell LCD embodiment of the disclosure. The term in-cell refers to the fact that the touch sensor is more fully integrated within the display stack in that at least one of the touch sensor layers is arranged below the display's colour filter. In particular, some of the display driver electrodes (the VCOM electrodes that provide a reference voltage for the TFTs) can perform a dual function as touch sensor electrodes (the X electrodes), their functional separation being achieved by time multiplexing, i.e. for part of a cycle the electrodes are used for the display and for another part of the cycle for touch sensing. The dual function is achieved by patterning the VCOM electrode layer, which in an LCD without touch sensor is simply an unstructured blanket. For in-cell designs, there are two possibilities: "one-sided" in-cell if both X and Y sensor electrode layers below the colour filter glass, and "two-sided" or "hybrid" in-cell if only one of the X and Y sensor electrode layers moves below the colour filter glass. In a hybrid in-cell design, the electrode layer above the colour filter glass, nearest to the touch panel, will be the layer used for sense (i.e. Y electrode) in a mutual capacitance measurements. It will be appreciated that in an in-cell design, the electronics driving the display and the touch sensor need to be coordinated, so that either one single IC is provided for jointly controlling the display and touch sensor, or, if dedicated display and touch-sensor controller ICs are retained, they need to exchange data to ensure coordination.

Figure 15:
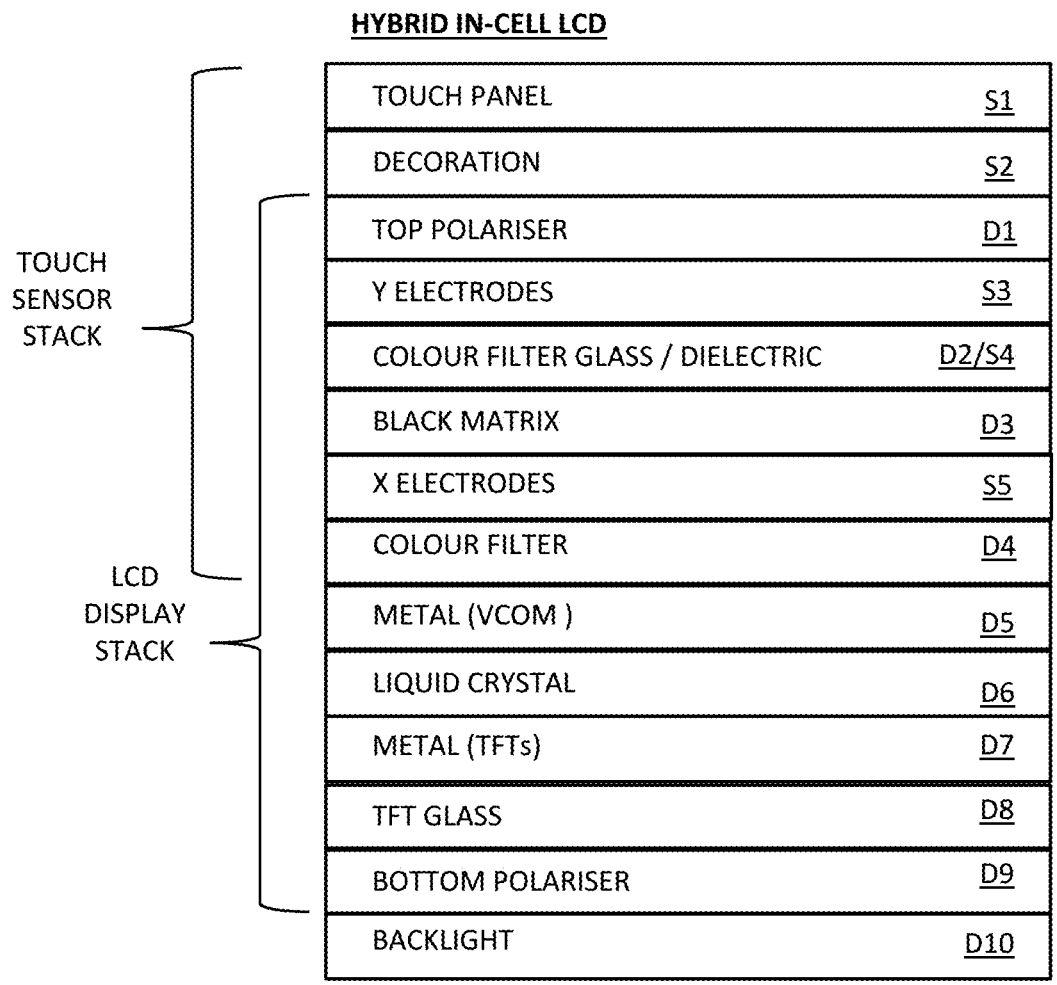
FIG. 15 shows a sensor and display stack of another hybrid in-cell LCD embodiment of the disclosure.

FIG. 15 shows a sensor and display stack of another hybrid in-cell LCD embodiment of the disclosure. In comparison to the stack of FIG. 14, the X electrodes are not integrated with the VCOM so that capacitive sensing measurements can take place in parallel with driving the display. The X electrodes are arranged on the colour filter. It is illustrated that the X electrodes are arranged on the upper side of the colour filter, but they could be arranged on the lower side. Moreover, a separate substrate layer for supporting the X electrodes could be provided.

Figure 16:
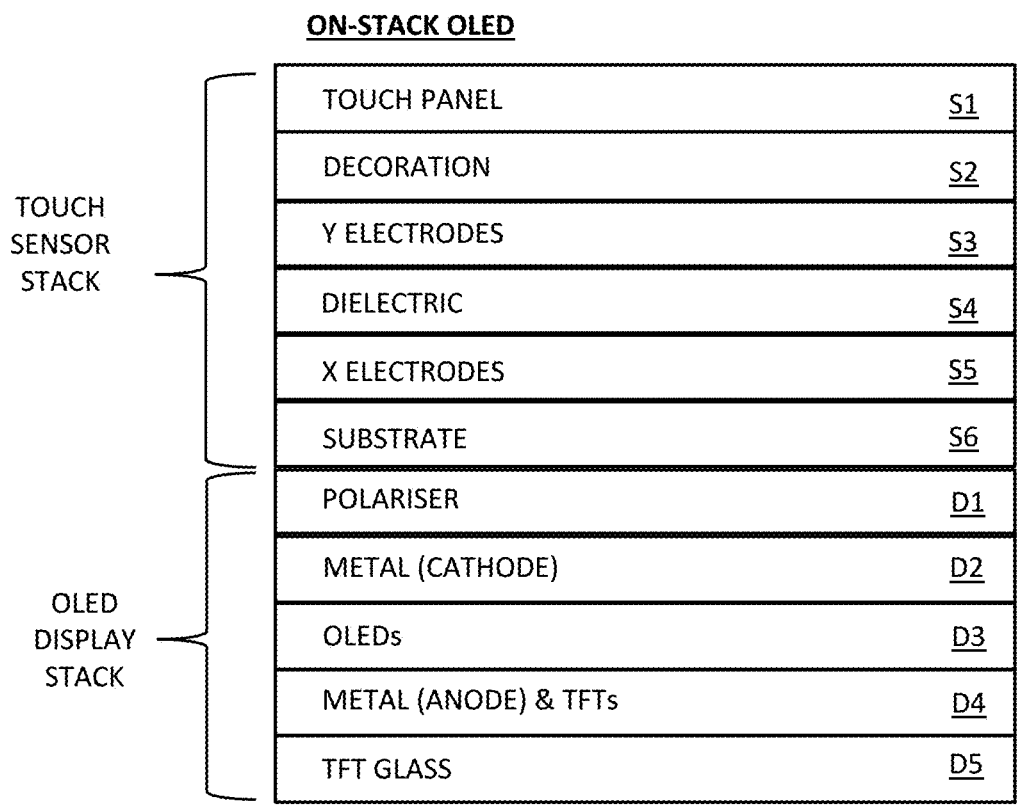
FIG. 16 shows a sensor and display stack of an on-stack OLED embodiment of the disclosure.

FIG. 16 shows a sensor and display stack of an on-stack OLED embodiment of the disclosure. The OLED display stack starts with a glass layer to act as a substrate for the thin film transistors (TFTs). The TFTs together with their addressing and other electrodes, referred to as metal, are arranged in top of the TFT glass. The metal in this layer includes metal for anode electrodes for driving the OLEDs. Next there follows the OLED layer, and another metal layer for the OLEDs cathodes. It will be appreciated that anode and cathode layers could be reversed. Finally, the display stack is completed by a polariser. For an OLED, it is noted that generally a colour filter and colour filter glass is not needed. However, for white OLEDs, they may be provided in which case those layers would be arranged above the OLEDs and below the metal (cathode) layer. It will also be appreciated that additional layers, such as adhesive, coatings and so forth may also be included as desired. The touch sensor stack is arranged on top of the display stack's cathode electrode layer and commences with a substrate on which the X electrodes are deposited. The X electrodes may be embedded in a dielectric matrix, such as an adhesive layer. On top of the X electrodes there is a dielectric and then the Y electrodes. There then follows an optional decoration layer followed by a touch panel. The touch panel may be a glass or a plastics material. Moreover, the touch panel may be coated, e.g. with an anti-scratch material for increased hardness and/or wear resistance.

Figure 17:
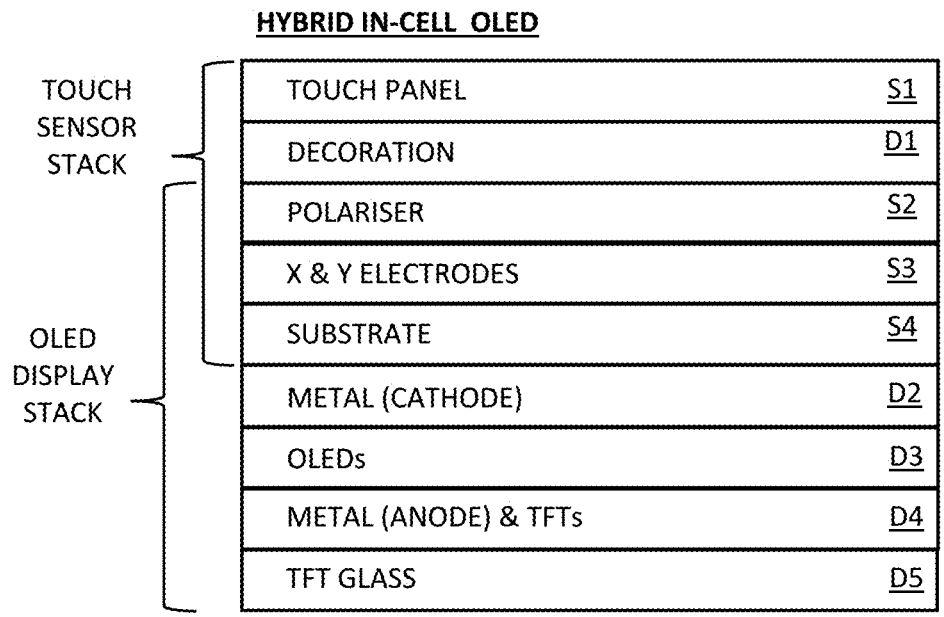
FIG. 17 shows a sensor and display stack of a hybrid in-cell OLED embodiment of the disclosure.

FIG. 17 shows a sensor and display stack of a hybrid in-cell OLED embodiment of the disclosure. The OLED display stack starts with a glass layer to act as a substrate for the thin film transistors (TFTs). The TFTs together with their addressing and other electrodes, referred to as metal, are arranged in top of the TFT glass. The metal in this layer includes metal for anode electrodes for driving the OLEDs. Next there follows the OLED layer and another metal layer for the OLEDs cathodes. It will be appreciated that anode and cathode layers could be reversed. The display stack is completed by a polariser, but in this embodiment the polariser is arranged above the touch sensor electrodes. Placing the polariser above the touch sensor electrodes has the advantage that the polariser partly obscures the pattern of the touch sensor electrodes, which would otherwise be more visible to a user under a wider variety of lighting conditions and angles of view. It will also be appreciated that additional layers, such as adhesive, coatings and so forth may also be included as desired. A slightly different structure could also result if the display was monochrome. Touch sensor stack layers are arranged on top of the display stack's cathode layer. The first touch sensor stack layer is a substrate. The X & Y electrodes are then formed in a single layer, and may be embedded in a dielectric matrix, such as an adhesive layer. There then follows the above-mentioned polariser for the display stack an optional decoration layer followed by a touch panel. The touch panel may be a glass or a plastics material. Moreover, the touch panel may be coated, e.g. with an anti-scratch material for increased hardness and/or wear resistance. Some common variations to this stack are as follows. We also note that the general comments on in-cell designs made in relation to the above hybrid in-cell LCD embodiments also apply to this in-cell OLED embodiment.

Figure 18:
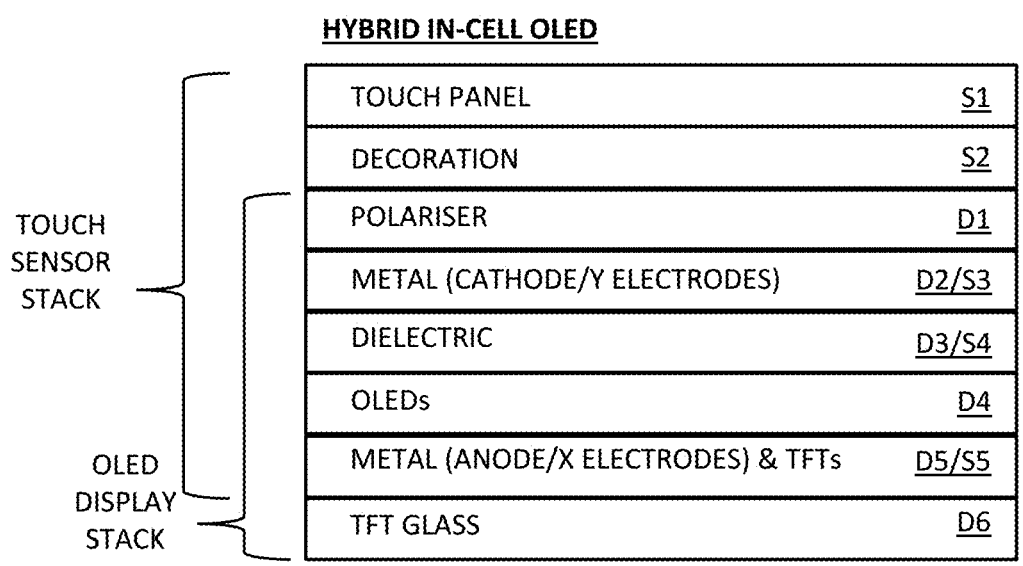
FIG. 18 shows a sensor and display stack of another hybrid in-cell OLED embodiment of the disclosure.

FIG. 18 shows a sensor and display stack of another hybrid in-cell OLED embodiment of the disclosure. The layer structure starts with a glass layer for acting as a substrate for the subsequent TFT layer which includes the TFTs and their drive electrodes, including dual function electrodes which serve as the VCOM electrodes for the OLEDs providing a reference voltage for the TFTs and the X electrodes for touch sensing. There then follows the OLED layer. A dielectric layer then follows which serves as a substrate for another metal layer comprising dual purpose electrodes to act as the cathodes for the OLEDs and the Y electrodes for sense in the touch sensor. The stack is completed with: the polariser for the display, an optional decoration layer and the touch panel. We also note that the general comments on in-cell designs made in relation to the above hybrid in-cell OLED embodiment and in-cell LCD embodiments also apply to this in-cell OLED embodiment.

In any of the example stacks, the X and Y electrode layers could be swapped. Further, in any of the example stacks, the X and Y electrode layers could be arranged in a single layer.

A touch screen computing device (or touch sensor device without screen) as presented herein may for example be a mobile phone (smartphone), phablet, tablet including specialist drawing tablet, laptop computer, personal computer, smart television, media player, satellite navigation device, games console, kiosk computer, or point-of-sale device. The device may be a user equipment as defined by one or more telecommunications standards. The device may be portable, e.g. a handheld computing device, or fixed. The touch screen (or touch sensor without screen) may form part of a household appliance or other appliance.

Device Context Description

Figure 19A:
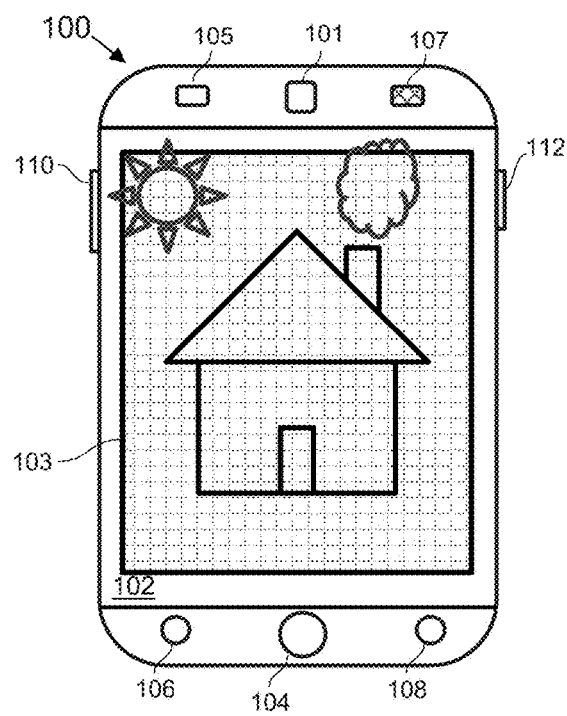
FIG. 19A is a schematic view of the front of a handheld touch screen computing device according to embodiments of the disclosure.
Figure 19B:
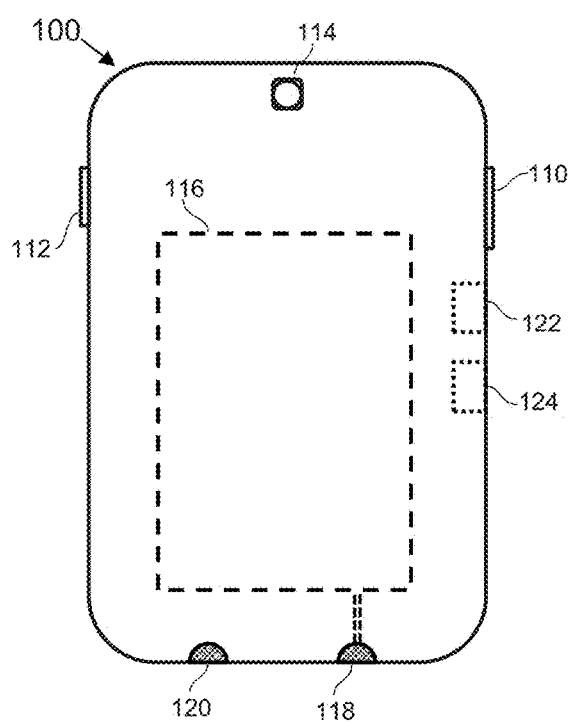
FIG. 19B is a schematic view of the rear of the handheld touch screen computing device of FIG. 19A.

FIG. 19A and FIG. 19B are schematic perspective views from the front and behind of a handheld touch screen computing device.

FIG. 20 is a block diagram of the functional components of the computing device of FIG. 19A and FIG. 19B.

Referring to FIG. 19A, the computing device 100 has a smartphone or tablet format. The computing device 100 is arranged in a housing with a front face (facing outwards from FIG. 19A), a rear face and a bezel forming the edges of a substantially rectilinear object. The front face is mostly taken up with a touch screen display which combines a display 102 (shown displaying a scene with house, smoke and sun) with a touch sensitive area 103 (shown with the hatching). Generally speaking for a touchscreen device, the touch sensitive area 103 and the area of the display 102 are at least partly co-extensive. The touch screen enables the user to input commands to applications running on the computing device through gestures, which vary from the humble single touch of a point on the display to select it, referred to in the art as a tap, and other single touch gestures, such as a swipe, through to multitouch gestures such as the two-finger pinch conventionally used for zooming in and out and rotating. We note that in this document references to gestures means touch gestures on a touch screen. The front face also accommodates a mechanical key (or button) 104 and two touch sensor keys (or buttons) 106, 108, on either side of the mechanical key 104. The edges of the housing accommodate a mechanical rocker switch 110 for volume control and an on/off switch 112. There is also a haptic layer embedded in the touch screen 102 to provide tactile feedback (not shown).

A front facing camera 101 for capturing stills or video images is arranged on the front face near the top of the housing facing forwards and has adjacent to it a microphone 105 for capturing audio and a speaker 107 for outputting audio.

Referring to FIG. 19B, the rear view, a rear facing camera 114 for capturing stills or video images is arranged near the top of the housing facing backwards. A battery 116 is accommodated within the housing and constitutes a power supply (shown with dashed lines). The power supply further includes an external power input socket 118 which may be used for powering the device as well as charging the battery. Alongside the power input socket 118 at the bottom of the device there is another external connector in the form of an audio jack 120 for audio output. Further external interfaces may be provided including various ports, holders and sockets for physical connections. With dotted lines we show two internal holders 122, 124 which may be for a SIM card and a memory card or further SIM card. The memory card is a kind of data storage device.

Referring to FIG. 20, this shows selected functional components of the computing device 100. The computing device 100 has radio components 130, input/output (I/O) components 140, one or more controllers 150 associated with one or more processors (μP) 160 and one or more memories 170, a power supply 180, sensor components 190 and external interfaces 200. The memory 170 is operable to store computer applications ('apps') 162 which comprise software code portions that are loadable into and executable by the processor 160. The controller(s) 150 may include a touch-sensor controller and a display controller, or a combined touch sensor and display controller.

The processor(s) may comprise separate processing units for specialist tasks such as touch sensing, display drive, video processing, speech/audio analysis and/or speech/audio synthesis. The controller(s) and associated processor(s) and memory(ies) have the task of controlling the computing device and executing computer programs stored in the memory(ies). The memory(ies) may store computer applications for running on the computing device as well as collecting data from the various I/O devices. The controller(s) typically functions to control overall operation of the computing device, in addition to the operations associated with the application programs. The controller(s) processes signals, data, information and the like input or output through the above-mentioned components and/or runs application programs saved in the memory, thereby processing or providing a user with appropriate information and/or functions.

The radio components 130 includes a WLAN (wireless local area network) transceiver, an LTE (long-term evolution) transceiver, and a GPS (global positioning system) module. The I/O components 140 include a display capable of displaying content and also acting as part of a graphical user interface, wherein the display may be based on a suitable technology such as liquid crystal or organic light emitting diodes, as well as a position-sensitive touch sensor area overlaid on, or formed as an integral part of, the display to serve as part of a graphical user interface in conjunction with the display with optionally other touch sensor areas or buttons (e.g. on the reverse side or edge (bezel) of the device housing. Further I/O components, as previously mentioned, are front and rear facing cameras for capturing stills or video images, a microphone for capturing audio, a speaker for outputting audio and a haptic output embedded in the touch screen to provide tactile feedback. The sensing components include a gyroscope, an accelerometer, an ambient light sensor, a magnetic field sensor and a temperature sensor, for example. The external interfaces may include various ports and sockets for physical connections, such as a SIM (subscriber identity module) card, wired LAN connectors, memory cards, audio jack socket, USB ports and so forth.

It will be clear to one skilled in the art that many improvements and modifications can be made to the foregoing exemplary embodiment without departing from the scope of the present disclosure.

What is claimed is:

1. A touch screen device incorporating a display and a capacitive touch sensor, the device comprising:
a display drive signal generator operable to output display drive signals at a certain frequency to the display, so that the display is driven in cycles to form image frames on a display area of the display, each image frame being created by a plurality of display drive cycles;
a set of sensor electrodes which define a touch sensitive area which is at least partly co-extensive with the display area;
a drive pulse generator operable to supply drive pulses to at least some of the sensor electrodes;
at least one sampling capacitor for accumulating charge from at least some of the sensor electrodes resulting from capacitive coupling between or to the sensor electrodes induced by edges of the drive pulses;
a sampling switch whose switch state defines a time window to enables a charge accumulation to take place on the at least one sampling capacitor;
a voltage reader for measuring a voltage associated with a charge accumulation on the at least one sampling capacitor;
a controller operable to perform capacitive touch sensor measurements according to a mode of operation in which a single touch sensor measurement is an integration made up of a plurality of charge accumulations, which take place in different display cycles and whose time windows commence with different time delays respectively from the drive pulse edge whose induced charge transfer they are accumulating;
wherein the time delay of each charge accumulation is equal to the sum of time windows of its prior charge accumulations in the same single touch sensor measurement.

2. The device of claim 1, wherein the sensor electrodes include a set of X sensor electrodes and a set of Y sensor electrodes arranged to cross each other to form a two-dimensional array of sensing nodes for performing mutual capacitance measurements.

3. The device of claim 2, operable in a mutual capacitance measurement mode in which:
the drive pulse generator is operable to supply drive pulses to the X sensor electrodes; and
the at least one sampling capacitor is operable to accumulate charge from the Y electrodes resulting from capacitive coupling at the sensing nodes between crossing X and Y sensor electrodes initiated by edges of the X-drive pulses.

4. The device of claim 2, operable in a self capacitance measurement mode in which:
the drive pulse generator is operable to supply drive pulses to the X sensor electrodes and the Y sensor electrodes; and
the at least one sampling capacitor is operable to accumulate charge from the X sensor electrodes and the Y sensor electrodes resulting from drive-pulse induced capacitive coupling between the sensor electrodes and touches.

5. The device of claim 3, operable in a self capacitance measurement mode in which:
the drive pulse generator is operable to supply drive pulses to the X sensor electrodes and the Y sensor electrodes; and
the at least one sampling capacitor is operable to accumulate charge from the X sensor electrodes and the Y sensor electrodes resulting from drive-pulse induced capacitive coupling between the sensor electrodes and touches.

6. The device of claim 1, operable in a self capacitance measurement mode in which:
- the drive pulse generator is operable to supply drive pulses to the sensor electrodes; and
- the at least one sampling capacitor is operable to accumulate charge from the sensor electrodes resulting from drive-pulse induced capacitive coupling between the sensor electrodes and touches.

7. The device of claim 1, wherein in said mode of operation the plurality of charge accumulations are accumulated with a number of time delays selected from the group: 2, 3, 4, 5, 6, 7, 8, 9 and 10.

8. The device of claim 1, wherein in said mode of operation for each touch sensor measurement the plurality of charge accumulations are induced by one of: positive-going drive pulse edges; negative-going drive pulse edges; and positive- and negative-going drive pulse edges.

9. The device of claim 1, wherein in said mode of operation the time delays are unequal and selected to provide charge accumulations and thus voltage values of approximately equal magnitude.

10. The device of claim 1, wherein for executing said mode of operation the controller is configured to vary the time delays between different ones of the charge accumulations by advancing the timing of the drive pulse edges within the display cycles.

11. The device of claim 1, wherein the controller is operable to control the switch state of the sampling switch so that each charge accumulation finishes before the end of one display cycle and the start of another, so as to avoid picking up noise associated with the start of the next display cycle.

12. The device of claim 1, further comprising a reset switch whose switch state diverts charge transfer initiated by drive pulses away from the sampling capacitor, the controller being operable in said mode of operation to control the switch state of the reset switch so as to divert charge transfer initiated by drive pulses away from the sampling capacitor when the sampling switch is in a switch state that does not enable a charge accumulation.

13. The device of claim 1, further comprising display electrodes configured to receive the display drive signals and to distribute them over the display area to form image frames, wherein the display electrodes have a significant, undesired capacitive coupling to the sensor electrodes which is a source of noise to the capacitive touch sensor, and wherein the controller is configured to separate temporally in each display cycle the display drive signals from the charge accumulation.

14. A method of operating a touch screen device incorporating a display having a display area, and a capacitive touch sensor comprising a set of sensor electrodes which define a touch sensitive area which is at least partly co-extensive with the display area, the method comprising:
- outputting display drive signals at a certain frequency to the display, so that the display is driven in cycles to form image frames on the display area, each image frame being created by a plurality of display drive cycles;
- supplying drive pulses to at least some of the sensor electrodes;
- accumulating charge from at least some of the sensor electrodes resulting from capacitive coupling between or to the sensor electrodes induced by edges of the drive pulses on a sampling capacitor;
- switching a sampling switch to define a time window for accumulating charge on the sampling capacitor;
- measuring a voltage associated with a charge accumulation on the sampling capacitor; and
- performing capacitive touch sensor measurements according to a mode of operation in which a single touch sensor measurement is an integration made up of a plurality of charge accumulations, which take place in different display cycles and whose time windows commence with different time delays from the drive pulse edge whose induced charge transfer they are accumulating;
- wherein the time delay of each charge accumulation is equal to the sum of time windows of its prior charge accumulations in the same single touch sensor measurement.

* * * * *